(12) United States Patent
Warnock et al.

(10) Patent No.: US 7,536,561 B2
(45) Date of Patent: May 19, 2009

(54) METHOD AND APPARATUS FOR IMPROVED INFORMATION TRANSACTIONS

(75) Inventors: Christopher M Warnock, Los Altos, CA (US); Richard M Holzgrafe, San Jose, CA (US); Tom J Santos, San Jose, CA (US); Jay C Nolan, Sunnyvale, CA (US)

(73) Assignee: Ebrary, Inc., Palo Alto, CA (US)

( * ) Notice: Subject to any disclaimer, the term of this patent is extended or adjusted under 35 U.S.C. 154(b) by 634 days.

(21) Appl. No.: 10/306,806

(22) Filed: Nov. 27, 2002

(65) Prior Publication Data
US 2003/0182578 A1 Sep. 25, 2003

Related U.S. Application Data

(63) Continuation-in-part of application No. 09/498,944, filed on Feb. 4, 2000.

(60) Provisional application No. 60/159,737, filed on Oct. 15, 1999.

(51) Int. Cl.
*G06F 11/30* (2006.01)
(52) U.S. Cl. .................. 713/193; 713/165; 713/166; 707/10; 707/203; 382/256; 382/264; 382/265; 382/282; 382/299
(58) Field of Classification Search ............... 715/526, 715/165, 166, 193; 707/10, 203; 382/256, 382/264, 265, 282, 299
See application file for complete search history.

(56) References Cited

U.S. PATENT DOCUMENTS 5,237,157 A 8/1993 Kaplan (Continued)

FOREIGN PATENT DOCUMENTS

EP 0881591 A1 12/1998

(Continued)

OTHER PUBLICATIONS

Cattoni et al, Geometric Layout Analysis Techniques for Document Image Understanding: a Review, ITC-IRST Technical Report #9703-09, Jan. 1998, pp. 1-68, XP002229195 Trento, Italy.

(Continued)

*Primary Examiner*—Kimyen Vu
*Assistant Examiner*—Beemnet W Dada
(74) *Attorney, Agent, or Firm*—Michael A. Glenn; Glenn Patent Group

(57) ABSTRACT

A method and system for making information available of a computer system and compensating information owners or creators for access to said information.

In various aspects, the invention provides a mechanism for giving users meaningful access to information via a computer system and network while protecting the interests of publishers and creators in information. The invention provides a solution for information including, but not limited to: text, graphics, photos, executable files, data tables, audio, video, and three dimensional data. In a further aspect, the invention comprises a new method for allowing a user to review a document while connected to a network but prevents the user from downloading, printing, or copying the document unless a fee is paid. In a further aspect, the invention comprises a new method for allowing a user to review documents at a first cost basis (which may be free), but only provides other access to documents, such as copying, printing, or downloading on a second cost basis. In a further aspect, the invention comprises a new method for allowing a user to purchase a selectable portion of a document at a price based on the amount of material selected where that amount of material can include a portion of a document, an entire document, or an anthology of components of multiple documents.

8 Claims, 28 Drawing Sheets

U.S. PATENT DOCUMENTS

| | | | |
|---|---|---|---|
| 5,247,575 A | 9/1993 | Sprague et al. | |
| 5,307,452 A * | 4/1994 | Hahn et al. | 345/592 |
| 5,532,920 A * | 7/1996 | Hartrick et al. | 715/500 |
| 5,546,528 A | 8/1996 | Johnston | |
| 5,619,247 A | 4/1997 | Russo | |
| 5,625,711 A | 4/1997 | Nicholson | |
| 5,643,064 A | 7/1997 | Grinderslev | |
| 5,680,479 A | 10/1997 | Wang et al. | |
| 5,729,637 A | 3/1998 | Nicholson | |
| 5,737,599 A | 4/1998 | Rowe | |
| 5,781,785 A | 7/1998 | Rowe | |
| 5,819,301 A | 10/1998 | Rowe | |
| 5,832,530 A | 11/1998 | Paknad | |
| 5,848,184 A | 12/1998 | Taylor et al. | |
| 5,860,074 A | 1/1999 | Rowe | |
| 5,930,813 A | 7/1999 | Padgett | |
| 5,991,780 A | 11/1999 | Rivette et al. | |
| 5,999,649 A | 12/1999 | Nicholson | |
| 6,041,316 A * | 3/2000 | Allen | 705/52 |
| 6,049,339 A | 4/2000 | Schiller | |
| 6,119,124 A | 9/2000 | Broder et al. | |
| 6,185,684 B1 | 2/2001 | Pravetz | |
| 6,282,653 B1 | 8/2001 | Berstis et al. | |
| 6,327,600 B1 | 12/2001 | Satoh et al. | |
| 6,345,279 B1 * | 2/2002 | Li et al. | 707/104.1 |
| 6,356,936 B1 | 3/2002 | Donoho | |
| 6,385,350 B1 | 5/2002 | Nicholson | |
| 6,389,541 B1 | 5/2002 | Patterson | |
| 6,446,068 B1 | 9/2002 | Kortge | |
| 6,516,337 B1 | 2/2003 | Tripp | |
| 6,606,613 B1 | 8/2003 | Altschuler et al. | |
| 6,629,097 B1 | 9/2003 | Keith | |
| 6,732,090 B2 | 5/2004 | Shanahan | |
| 6,920,610 B1 * | 7/2005 | Lawton et al. | 715/526 |
| 6,988,124 B2 | 1/2006 | Douceur et al. | |
| 2003/0033288 A1 | 2/2003 | Shanahan | |
| 2003/0037094 A1 | 2/2003 | Douceur et al. | |
| 2003/0037181 A1 | 2/2003 | Freed | |
| 2003/0061200 A1 | 3/2003 | Hubert | |
| 2003/0185448 A1 | 10/2003 | Seeger et al. | |
| 2004/0030680 A1 | 2/2004 | Veit | |
| 2004/0133544 A1 | 7/2004 | Kiessig | |
| 2004/0133545 A1 | 7/2004 | Kiessig | |
| 2004/0133588 A1 | 7/2004 | Kiessig | |
| 2004/0133589 A1 | 7/2004 | Kiessig | |
| 2004/0205448 A1 | 10/2004 | Grefenstette | |
| 2005/0022114 A1 | 1/2005 | Shanahan | |

FOREIGN PATENT DOCUMENTS

| | | |
|---|---|---|
| EP | 0881592 | 12/1998 |
| EP | 0881592 A1 | 12/1998 |
| EP | 0 881 592 (B2) | 10/2002 |
| EP | 1 284 461 A1 | 2/2003 |
| EP | 0 881 591 (B1) | 9/2003 |
| JP | 2001-175807 | 6/2001 |
| JP | 2001175807 | 6/2001 |
| WO | WO 96/27155 | 9/1996 |
| WO | WO 98/42098 | 4/1998 |
| WO | WO 98/42098 | 9/1998 |
| WO | WO 99/05618 | 4/1999 |
| WO | WO 99/39286 | 5/1999 |
| WO | WO 01/20596 A1 | 3/2001 |
| WO | WO 01/57711 A1 | 9/2001 |
| WO | WO 02/41170 A2 | 5/2002 |
| WO | WO 2005/062192 A1 | 7/2005 |

OTHER PUBLICATIONS

Bartal, "Probabilistic Approximation of Metric Spaces and Its Algorithmic Applications," 1996, In: FOCS Proceedings of the 37th Annual Symposium on Foundations of Computer Science. Washington DC, IEEE, Abstract, pp. 2-3, ISSN 0272-5428.

Zhang, et al., "BIRCH: An Efficient Data Clustering Method for Very Large Databases," 1996, In: ACM Sigmod Record, Proceedings of the 1996 ACM SIGMOD International Conference on Management of Data, New York: ACM Press, vol. 25, Issue 2, pp. 103-114, ISSN 0163-5808.

* cited by examiner

Bermuda

Toomas Gross

Bermuda's flexible regulatory conditions, strong infrastructure, neutral tax conditions, and advanced internet services and legislation continued to favour smooth and steady economic growth at the end of 2000 and in early 2001, especially in the insurance and reinsurance industries. However, concerns of the negative impact of the US economic contraction on the Bermudan economy were mounting in spring 2001.

Economic developments

The Bermudan tourism industry is continuing the dramatic decline. Air arrivals during the last quarter of 2000 fell 12.5 percent. All commercial tourist accommodations reported low occupancy levels during that time. The total number of annual visitors has dropped continuously since 1997. With 534,000 visitors in 2000, the number was 3.2 percent down on 1999.

*FIG. 11*

Bermuda

Toomas Gross

Bermuda's flexible regulatory conditions, strong infrastructure, neutral tax conditions, and advanced internet services and legislation continued to favour smooth and steady economic growth at the end of 2000 and in early 2001, especially in the insurance and reinsurance industries. However, concerns of the negative impact of the US economic contraction on the Bermudan economy were mounting in spring 2001.

Economic developments

The Bermudan tourism industry is continuing the dramatic decline. Air arrivals during the last quarter of 2000 fell 12.5 percent. All commercial tourist accommodations reported low occupancy levels during that time. The total number of annual visitors has dropped continuously since 1997. With 534,000 visitors in 2000, the number was 3.2 percent down on 1999.

*FIG. 12*

Bermuda

Toomas Gross

Bermuda's flexible regulatory conditions, strong infrastructure, neutral tax conditions, and advanced internet services and legislation continued to favour smooth and steady economic growth at the end of 2000 and in early 2001, especially in the insurance and reinsurance industries. However, concerns of the negative impact of the US economic contraction on the Bermudan economy were mounting in spring 2001.

Economic developments

The Bermudan tourism industry is continuing the dramatic decline. Air arrivals during the last quarter of 2000 fell 12.5 percent. All commercial tourist accommodations reported low occupancy levels during that time. The total number of annual visitors has dropped continuously since 1997. With 534,000 visitors in 2000, the number was 3.2 percent down on 1999.

*FIG. 17A*

Bermuda

Toomas Gross

Bermuda's flexible regulatory conditions, strong infrastructure, neutral tax conditions, and advanced internet services and legislation continued to favour smooth and steady economic growth at the end of 2000 and in early 2001, especially in the insurance and reinsurance industries. However, concerns of the negative impact of the US economic contraction on the Bermudan economy were mounting in spring 2001.

Economic developments

The Bermudan tourism industry is continuing the dramatic decline. Air arrivals during the last quarter of 2000 fell 12.5 percent. All commercial tourist accommodations reported low occupancy levels during that time. The total number of annual visitors has dropped continuously since 1997. With 534,000 visitors in 2000, the number was 3.2 percent down on 1999.

*FIG. 17B*

*1.1* Bermuda

*2.1* Toomas Gross

*3.1* Bermuda's flexible regulatory conditions, strong infrastructure, neutral tax conditions, and advanced internet services and legislation continued to favour smooth and steady economic growth at the end of 2000 and in early 2001, especially in the insurance and reinsurance industries. However, concerns of the negative impact of the US economic contraction on the Bermudan economy were mounting in spring 2001.

Economic developments

The Bermudan tourism industry is continuing the dramatic decline. Air arrivals during the last quarter of 2000 fell 12.5 percent. All commercial tourist accommodations reported low occupancy levels during that time. The total number of annual visitors has dropped continuously since 1997. With 534,000 visitors in 2000, the number was 3.2 percent down on 1999.

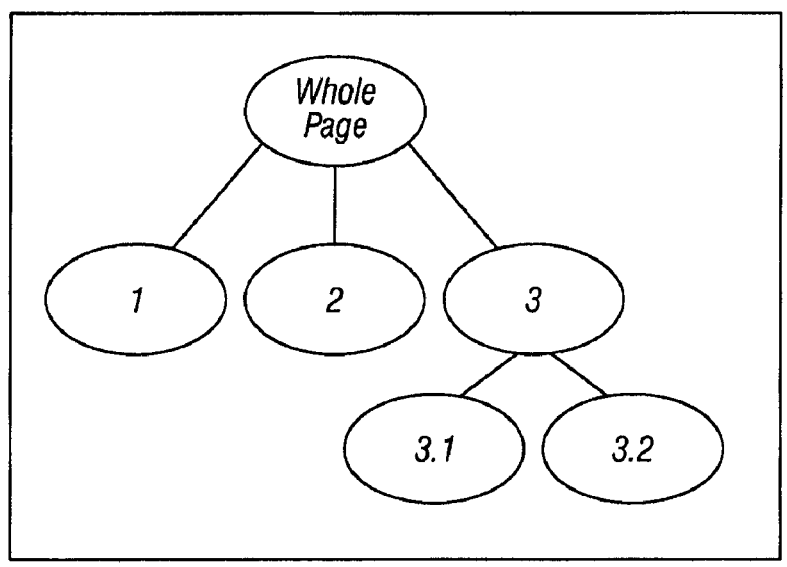

*FIG. 19*

Many return for jobs with tribe

Tribal officials increase about 20 percent with the opening last Thursday of the new Diamond-Noga Highway casino & hot Despite the windfall, local tribes have fallen short of mandates that they use gaming revenues to become more self sufficient, develop their economies and build stronger governments, a investigation found. The Tohono O'odham Nation's per capita federal spending, when adjusted turning to gangs to fill their free time. The tribe invested $30 million nearly two years ago to build five youth centers to Cover young people an story native to gangs, but there's no telling yet whether they've made a difference.
Gangs lure kids away from school. Dropout rates at the tribe's Baboquivari High School are spiraling — up to 26 percent in 2005-06 from just under 16 percent five earlier — cutting into the pool of applicants

*FIG. 20B*

Many return for jobs with tribe

Tribal officials increase about 20 percent with the opening last Thursday of the new Diamond-Nog[a] Highway casino & ho[tel]. Despite the windfall, local tribes have fallen short of mandates that they use gaming revenues to become more self sufficient, develop their economies and build stronger governments, a investigation found. The Tohono O'odham Nation's per capita federal spending, when adjusted turning to gangs to fill their free time. The tribe invested $30 million nearly two years ago to build five youth centers to young people an [alte]rnative to gangs, but there's no telling yet whether they've made a difference. Gangs lure kids away from school. Dropout rates at the tribe's Baboquivari High School are spiraling — up to 26 percent in 2005-06 from just under 16 percent five earlier — cutting into the pool of applicants

Cover story

*FIG. 21*

METHOD AND APPARATUS FOR IMPROVED INFORMATION TRANSACTIONS

CROSS REFERENCE TO RELATED APPLICATIONS

This application is a continuation-in-part of U.S. patent application Ser. No. 09/498,944 filed Feb. 4, 2000, which claims the priority of U.S. provisional patent application Ser. No. 60/159,737 filed Oct. 15, 1999.

CROSS REFERENCE TO RELATED APPLICATIONS

This application claims priority from provisional patent application 60/159,737, filed Oct. 15, 1999, which is incorporated herein by reference.

FIELD OF THE INVENTION

The present invention relates to methods and systems for providing information over a public data network with access control and paid transactions.

BACKGROUND OF THE INVENTION

At the present time, many people are familiar with accessing information over a data network. For purposes of this discussion, it is helpful to consider two categories of network. Free or public data networks are networks, such as the Internet, where access to the network and to information publicly posted on the network is provided free of charge and generally free of subscription identifiers or login.

In contrast to free networks, for purposes of this discussion, are subscription or paid information services or networks. In subscription networks, users typically pay some type of periodic usage fee and may also pay for access to particular services or databases. Subscription networks include networks or data systems designed for the public at large, such as AOL™, CompuServe™, or Prodigy™. Subscription networks also include networks or data systems designed for particular professions or interest areas, such as Lexis™ and Westlaw™ in the legal field, Nexis™ for news stories, or Dialog™ for a range of documents including patents, technical publications, and business publications. Some paid information services allow limited searching and viewing of documents for free or after paying a subscription fee, but full access to documents, either for viewing, printing, or downloading, generally requires a fee. In many instances, the fee is a per document or per record charge, though systems have existed that included a per page or per line charge for performing certain actions, such as printing.

It should be understood that paid and free categories are not rigid, and both free and paid services can include some characteristics of the other.

A problem not yet fully addressed, particularly on free networks, is how to compensate copyright owners or information assemblers for access to information or documents that are placed on the free network, while allowing users meaningful access to the data.

A number of prior systems for allowing paid access to information have been developed, but each of these has had shortcomings, as discussed below.

One large document database that is accessible for free over the Internet is the IBM Intellectual Property Network, currently available at http://www.patents.ibm.com/. This service allow free searching in a number of patent databases and allows users, for free, to view a textual representation (generally in HTML format) of the front page of patents and in some case patent claims for free. A user can also view a graphical image of each patent page in a graphical format (generally TIFF) for free and can print or download the graphical scan of the page. However, this graphical format provides reduced usability for the user, because bit-mapped text in the TIFF file cannot be searched or selected. File sizes are generally also large and therefore slow to download. Text also cannot be copied from the graphical format. If a user wishes access to the full text of a patent in a text file format, the user pays a fee to download a version of the document. Various file formats, such as PDF, HTML, or TIFF are available for download, but accessing any of these formats requires paying a per-document fee. The service provides very limited paid access to portions of documents. For example, in one option, the user can download the front pages of up to six patents for a single fee. The service does not allow users to print or copy directly from a document at a different cost structure, but has just one paid access, file download. Once a file is downloaded, it is freely and repeatedly viewable or printable by the user and, so far as the software is concerned, it can be freely distributed and copied.

Services that require an initial or ongoing subscription fee are unattractive to consumers who may be one time or very occasional users of the database. Subscription services can, at times, be unattractive to information providers, because requiring subscriptions can reduce service utilization and revenues. Subscription services are, at times, unattractive to creators and publishers because it can be difficult to fairly compensate a particular document creator when a database may contain thousands of documents by thousands of different creators. Services that allow free access to a document after it is downloaded may be unattractive to publishers because once high-quality electronic content is made available, there is no technical restriction on a user from electronically republishing the content.

A number of different document formats are presently available that allow additional information, security features, or computer code to be included in a text/graphic document. The Microsoft Word™ doc document format, for example, can include macros, bookmark and cross-reference information, revision history information, two-password password protection, etc.

The Adobe Acrobat Portable Document Format (PDF), and the PostScript™ layout language on which it is based, also provide mechanisms for including various procedures related to encryption and security. Adobe has also released some technology for managing and distributing secured documents using PDF. Adobe® PDF Merchant™ is server-based software that enables eBook and content providers to sell and distribute documents electronically with security. It is designed to integrate into existing eCommerce and transaction servers, making it easy for publishers, distributors, and retailers to encrypt volumes of Adobe Portable Document Format (PDF) files and sell them over the Web and provides mechanisms for Managing the distribution of electronic keys. Content owners can specify standard Acrobat permissions, including privileges for printing, changing the document, selecting text and graphics, and adding or changing annotations and form fields. Further information is available from http://www.adobe.com/products/pdfmerchant/main.html.

There exist some examples of easily accessible information tools such as definition and thesaurus look-ups. The NeXT operating system, for example, allowed users to click on words and thereby access definitions from a Merriam-Webster® dictionary. Guru-NET is a recent service using similar techniques to provide additional information to users based on indicated text. Many of these systems, such as Guru-NET, for example, fail when attempting to provide information tools access in encoded documents, such as PDF. These systems are not incorporated with systems for paid document access.

What is needed is an information accessing and distribution service that can allow users meaningful access to electronic data or information with a pricing arrangement attractive to both users of the system and information publishers or providers.

SUMMARY OF THE INVENTION

The present invention, in various aspects, involves a method and/or system for distribution of information (including any digital data) on a network. Various embodiments and aspects of the invention operate to give users meaningful access to the information while allowing information owners or distributors to receive fair compensation.

In the present discussion, information available over a public network will be referred to as contained in documents. It should be understood that the terms information or document refer to any type of digitally-encoded data that can be presented or transmitted by a computer or other digital device including, but not limited to, text, graphics, photos, executable files, data tables, audio, video, three dimensional data, or multimedia data that is a combination of any of these.

In a further embodiment, the invention comprises a new method for allowing a user to review a document while connected to a network, but prevents the user from downloading, printing, or copying the document without receiving an additional authorization or transaction.

In a further embodiment, the invention comprises a new method for allowing a user to review documents at a first cost basis (which in a preferred embodiment will be free, while in other embodiments some type of cost may be involved), while providing other access to documents, such as copying, printing, or downloading, on a second cost basis.

In a further embodiment, the invention comprises a new method for allowing a user to access a user selectable portion of a document at a price based on the amount of access selected to a fine granularity. Material selected can include a user-selectable portion of a document, down to a word for copying, an entire document, or an anthology of components of multiple documents. Different actions may be allowed on different portions of documents, for example, a publisher my allow a user to print an entire document, but may only electronically allow a user to copy a limited portion of a document.

In a further embodiment, the invention can be understood as a system that allow access to documents for viewing at no cost or a reduced cost and that requires a per action fee each time other actions are desired on a document. In contrast to prior art systems, even after a first printing of a document, the present invention in this embodiment continues to maintain protection for the information contained in the document and to restrict access as a publisher specifies.

In a further embodiment, the invention comprises a new method for tracking and compensating creators of material when that material is accessible from a document database and in a further embodiment when that material is incorporated into a document that may contain material created by others and for which others are compensated.

A further understanding of the invention can be had from the detailed discussion of specific embodiments below. For purposes of clarity, this discussion refers to devices, methods, and concepts in terms of specific examples. However, the method of the present invention may operate in a wide variety of applications. It is therefore intended that the invention not be limited except as provided in the attached claims.

Furthermore, it is well known in the art that computer systems can include a wide variety of different components and different functions in a modular fashion. Different embodiments of the present invention can include different mixtures of elements and functions and may group various functions as parts of various elements. For purposes of clarity, the invention is described in terms of systems that include different innovative components and innovative combinations of components. No inference should be taken to limit the invention to combinations containing all of the innovative components listed in any illustrative embodiment in this specification.

Furthermore, it is well known in the art of interact applications and software systems that particular file formats, languages, and underlying methods of operation may vary. The disclosure of a particular implementation language or format of an element should not be taken to limit the invention to that particular implementation unless so provided in the attached claims.

All publications, patents, and patent applications cited herein are hereby incorporated by reference in their entirety for all purposes. The invention will be better understood with reference to the following drawings and detailed description.

BRIEF DESCRIPTION OF THE DRAWINGS

FIG. 11 illustrates the non-intuitive text selection resulting from selection of a text in an image having a multi-column layout of the text.

FIG. 12 illustrates the improved text selection resulting from use of the mapping optimization function shown in FIG. 10A and B when used with the image having a multi-column layout of the text of FIG. 11.

FIG. 19 illustrates the completion of the operations Performed by the columnizer function and the ordering of regions inherent in the internal tree structure.

FIG. 21 illustrates the desired result of the operation of the regionizer on the example shown in FIG. 20.

DESCRIPTION OF SPECIFIC EMBODIMENTS

1. Methods of Operation 1.1 Providing Secure Access to a Document

Figure 1:
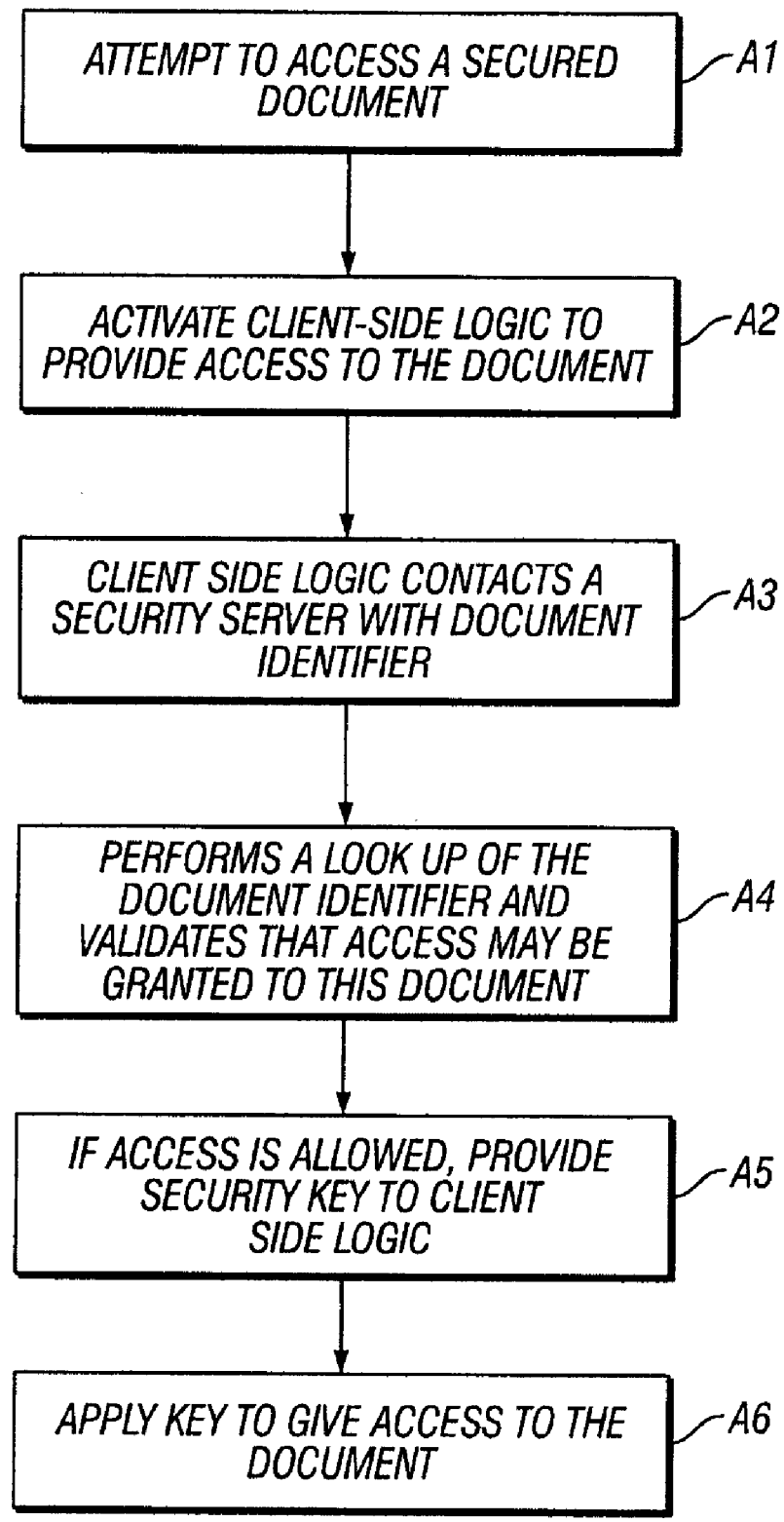
FIG. 1 is a flow chart illustrating a method for providing secure access to a document according to a specific embodiment of the invention.

FIG. 1 is a flow chart illustrating a method for providing secure access to a document according to a specific embodiment of the invention.

According to this embodiment, when a user first attempts to access a secured document according to the invention (Step A1), client-side logic is activated to provide access to the document (Step A2). Without this client-side logic, the user cannot access the document because of the security features in the document. The client side logic then contacts a security server with a document identifier derived from the document (Step A3). The security server performs a look up of the document identifier and validates that access may be granted to this document (Step A4) based on the document identification and possibly other factors (such as, but not limited to, any combination of: a user's identification, presence of a valid and active charging account, a user's network address, a user's age verification, etc.). If validation is indicated, the security server transmits back to client side logic a security key that may be used to access the document (Step A5). If validated, the client-side logic then applies the key to give access to the document (Step A6).

Application of the security key to "unlock" the document can be performed in a variety of ways. In one embodiment, the majority of data in the document (other than the document id and possibly other citation or abstract data) is encrypted using a standard encryption scheme, such as is PGP. Each document has its own key, which is kept at the security server indexed by document identification. The security key and request for the security key that pass between the client-side logic and the security server may be further encrypted using a secure data channel via public-key encryption or other encryption method(s) so that the key can only be decoded and applied by the client-side logic requesting it.

According to one embodiment of the invention, a security feature enables documents to be freely browsed from a network location but does not allow documents to be copied or downloaded in any meaningful way because the file is encrypted and cannot be accessed without the client-side logic of the invention. In a further embodiment, the invention does not allow downloading of documents from the server, only serving of portions to be viewed from the documents. In this embodiment, the client-side logic will only allow decrypting the document as the document is currently being served from the server. Once the client-side logic is used to access the invention, the logic restricts the types of actions that can be performed on the document and ensures that the specified fee is paid before allowing certain transactions.

In one specific embodiment, in order to access any secured document, the client side logic must be able to communicate with a security server before the logic allows access to the document. The security server provides the security key allowing access to the document.

In various embodiments, the client-side logic may be incorporated into a plug-in that operates cooperatively with a browser or viewer. As understood in the art, the plug-in will then be available when the browser is running.

In another embodiment, the client-side logic may be installed as an independent service under the operating system as system routines or an independent application. In this embodiment, access and security features, according to the invention, may be provided for files accessed outside of a browser and accessed locally.

In an alternative further embodiment, a user cannot save a secured document. This prevents modified or insecure copies from being created and distributed.

It will be seen that in one embodiment of the method just described, in general terms, access to documents is restricted on a per use and a per action basis. Even if a document is allowed to be downloaded to a local system, each attempt to perform an action on a document will require activation of the security logic of the present invention and may require a security key. Thus, even where information is allowed to be downloaded to a system and freely viewed, other actions such as copying, printing, may be restricted or may be allowed only after payment of the required fee each time the action is requested.

As a first aspect, an access method according to the invention will detect and interrupt copying, printing or other actions on a document if that document was formatted according to the invention. The invention determines this if the invention necessarily and successfully used its security features to open the document. If so, the invention software remembers and keeps this knowledge. When the document is closed, the invention determines this and deletes the record.

Once it is determined that a document is one constructed according to the invention, for predefined restricted actions, the invention interrupts standard handling and substitutes or inserts custom handling. Control is passed to the default handler if a document is not one created in accordance with the invention.

1.2 Requesting a Paid Action

Figure 2:
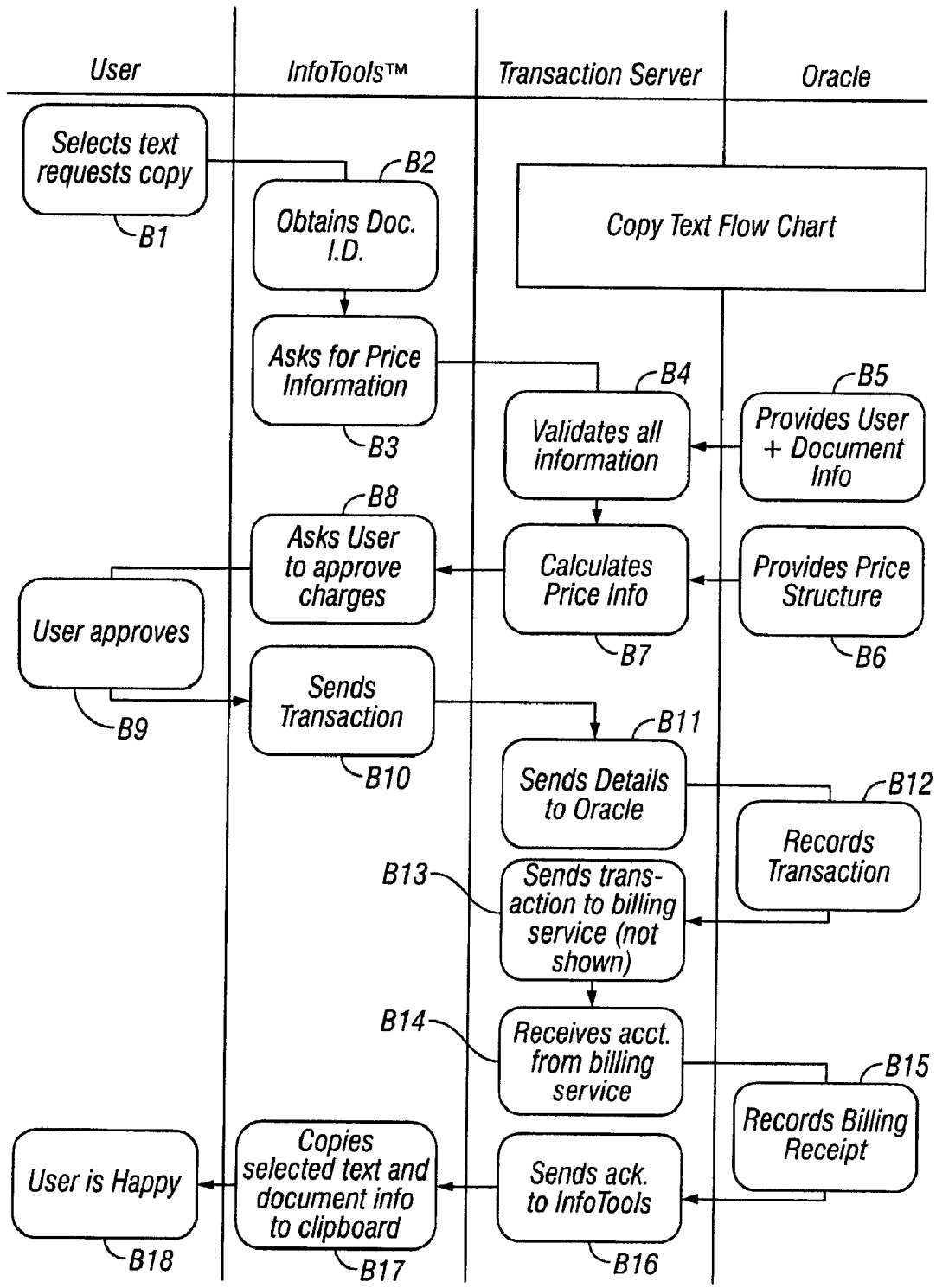
FIG. 2 is a flow chart illustrating a method for allowing a paid action according to an embodiment of the invention.

FIG. 2 is a flow chart illustrating a method for allowing a paid action according to an embodiment of the invention. In this example, the method shown is for access of text information to request to copy a portion of information. However, accessing information for any other type of action (such as printing, downloading, playing, etc.) may be performed according to the invention by the same general method.

FIG. 2 shows the method in the context of a particular system embodiment, with specific functions performed by four different system participants: a user, a logic module installed on the user's computer (herein at times referred to as InfoTools™ and also understood as client-side logic), a transaction server, and a database server (typically an advanced SQL-type database system.) While the method and other methods described herein may be described in a specific sequence with specific participants performing specific functions, these descriptions should be understood as examples; and variations in accordance with the general methods described in the attached claims are possible.

As shown, this specific embodiment method of the invention commences when a user requests a desired action for an indicated portion of information (Step B1). Requesting an action can take place in a variety of ways as known in the art, but as discussed elsewhere herein, in a preferred embodiment, a user will request a specific action in way with which they are familiar from other applications. For example, in a specific embodiment, a copy action may be requested by using a Control-C or Command-C keystroke (depending on computer platform), a right-click menu, or a menu-bar selection, all as commonly known in the art. Upon detecting a requested action, the client-side logic obtains an identifier for the selected information (Step B2). An identifier for the selected information consists of an identifier for the document plus an identifier for the selected range of text or data within the document (in one embodiment, the latter is the range of pages on which the selection is found). The document identifier is a value invisibly embedded in the document and/or derived from the URL by which the document was obtained from the server.

The client-side logic composes a request for pricing information and transmits that request to a transaction server (Step B3). The transaction server validates the information in the request (Step B4) and receives from a database, user and document information (Step B5). The database also provides price structure (Step B6) and the transaction server calculates price information and transmits that information back to the client side logic (Step B7).

The client-side logic determines if the pricing is approved by the user (Step B8), either by displaying a request for approval to a user or by reference to user setup data. Upon determining user approval (Step B9), the client-side logic sends the transaction to the transaction server (Step B10) which forwards the details (Step B13) to be recorded in the database (Step B12). The transaction server may also send the transaction to a credit card or electronic cash service to complete transfer of funds (Step B13) and receives account information from that service (Step B14), which is also recorded in the database (Step B15). With transaction payment successfully verified, an acknowledgement is sent back to the client side logic (Step B16) which allows the access the user has requested (in a specific embodiment including copying and formatting the selected text and document info such as citation data to the clipboard) (Step B17) to satisfy the user (Step B18).

According to a specific embodiment, document identification and range identification may be specifically provided for according to the invention, or, where these features are available in a standard viewer, the invention may use features from the standard viewer.

Furthermore, for some document formats the process of determining the range for selected text for purposes of performing an action, such as copying, will involve an algorithm that is part of the logic of the invention that will iterate over each rectangle of the selected text that describes the physical location (on a printed or displayed page of text) of each word or portion of a word in the selected text, and from those locations determining the range desired.

1.3 Alternative Method for Requesting a Paid Action

This section discusses a simplified alternative method for performing an action (in this case, the example action is printing). It should be understood that this and the previously described example method can be adapted to a variety of different paid actions, such as, but not limited to, printing, copying, executing, playing, etc.

As in the discussion above, in this example, printing also requires a transaction indication, in this case a user requests a certain number of pages to be printed. In specific embodiments, the invention may generate the cost of printing the page or text ranges based upon the number of pages in a book, the cost of a book, the number of pages being printed, the number of off-line copies being made or other algorithms which can be specified by the content provider.

As shown, this specific embodiment method of the invention commences when a user indicates an action for an indicated portion of information (Step C1). An action options dialog (in a specific embodiment one that is standard for the platform) appears (Step C2) and the user indicates the desired options (Step C3). Another dialog appears (Step C4) in which the user enters his/her identity for accounting purposes (name and password) (this step may be automated according to user preferences) (Step C5). The user's request and identity and the identifier for the indicated portion of information (document ID and page or word range) are sent to a server (Step C6). The server verifies the user's identity (Step C7) and calculates a price for the requested operation (Step C8) and returns that price to the client-side logic (Step C9). The client-side logic determines whether the price will be accepted by the user (Step C10). If declined, the request is cancelled (Step C11). If accepted, all prior information is again transmitted to the server (Step C12) along with the agreed-upon price. The server again verifies all information (Steps C12 and C13) and verifies that the price presented to the user is correct (Step C14). If any verification step fails, the request is cancelled (Step C15). If verification succeeds, the server returns an acknowledgement to the client side logic (Step C16) which then processes the user's request by printing the indicated portion of the information (Step C17).

In a specific embodiment, an access system according to the invention is designed specifically to work with a third-party document viewer that does not directly allow the display of an authorization dialog between the print dialog and printing. Therefore, in this embodiment, the invention intercepts and modifies the interaction with the user during the print process, calling the system-specific print dialog mechanisms directly, bringing up the authorization dialog, completing client/server transactions, and then calling the document viewer's default printing function. In an alternative embodiment, the invention can use a security handler callback that is called between the print dialog and the sending of data to the printer if such callbacks are provided by a particular document viewer.

1.4 Placing Documents into a Repository

Figure 3:
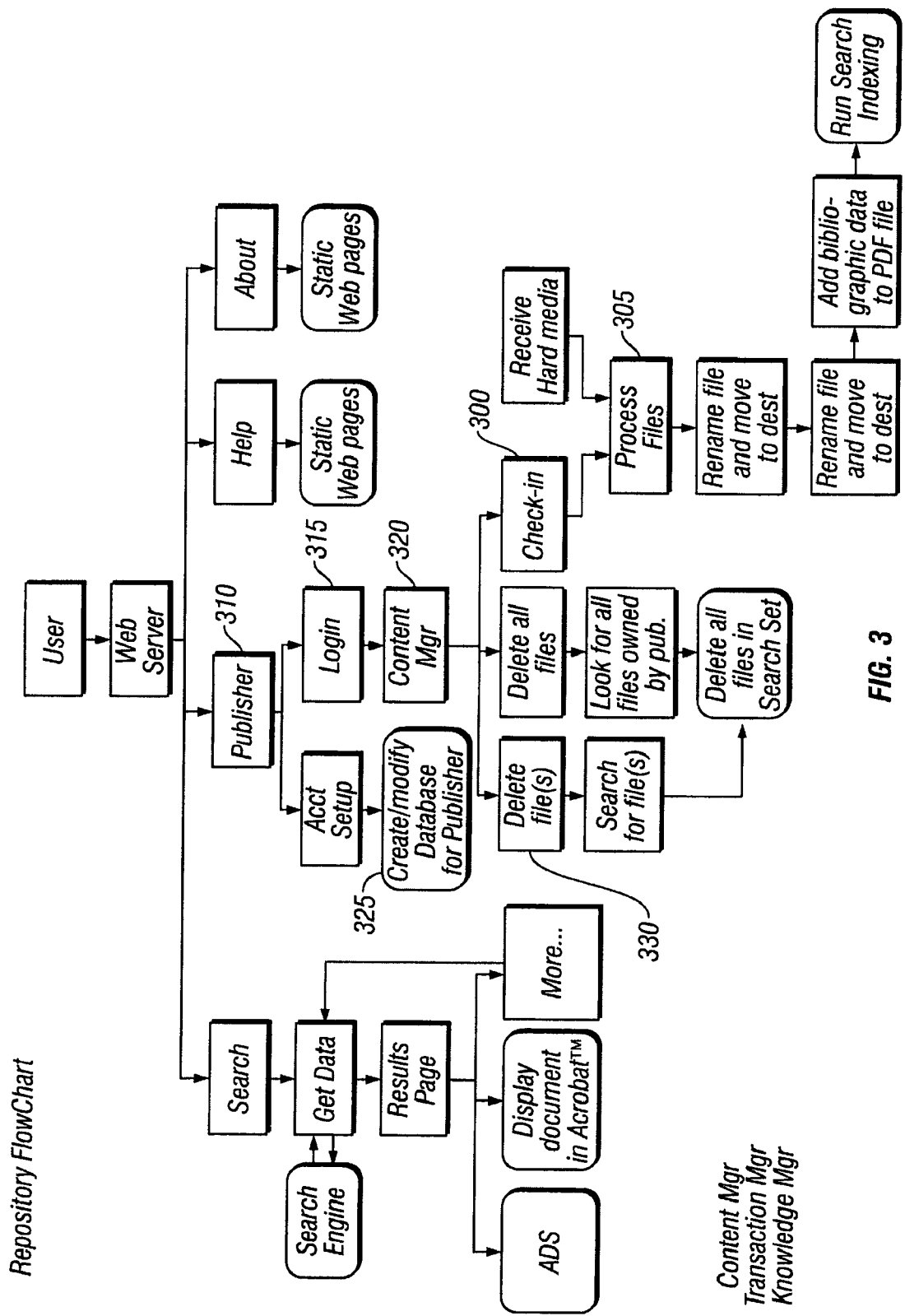
FIG. 3 is a flow chart illustrating a method for accepting documents into a repository and formatting documents for user access according to a specific embodiment of the invention.

FIG. 3 is a flow chart illustrating a method for accepting documents into a repository and formatting documents for user access according to a specific embodiment of the invention. According to the invention, the document repository will hold the system's provided documents and will participate in restricting access to only authorized access.

In various specific embodiments of the invention, the repository may have multiple versions or formats of some or all documents in the repository. For example, a low-resolution version may be available for browsing and a higher version would be available for printing.

Processing of documents for a repository according to the invention may further involve one or more of the following: a check-in 300 and processing 305 feature, addition of security codes, addition of publisher identifications, addition of caption information. In one embodiment, an encryption key is established for each file, and a substantial part of the file is encrypted with the key. In addition, other data fields, such as bibliographic data, ownership or authorship date, etc., are added to the file. To complete check-in and processing of files, files are added to the database index and files are placed into the database.

Also, in one specific embodiment, there is provided a procedure for publishers 310 or owners of information to login 315 to the system and manage their own content 320. As shown, a publisher can create or modify database properties 325, review the content of databases, delete files 330, etc.

1.5 Creating Anthology Documents

Figure 4:
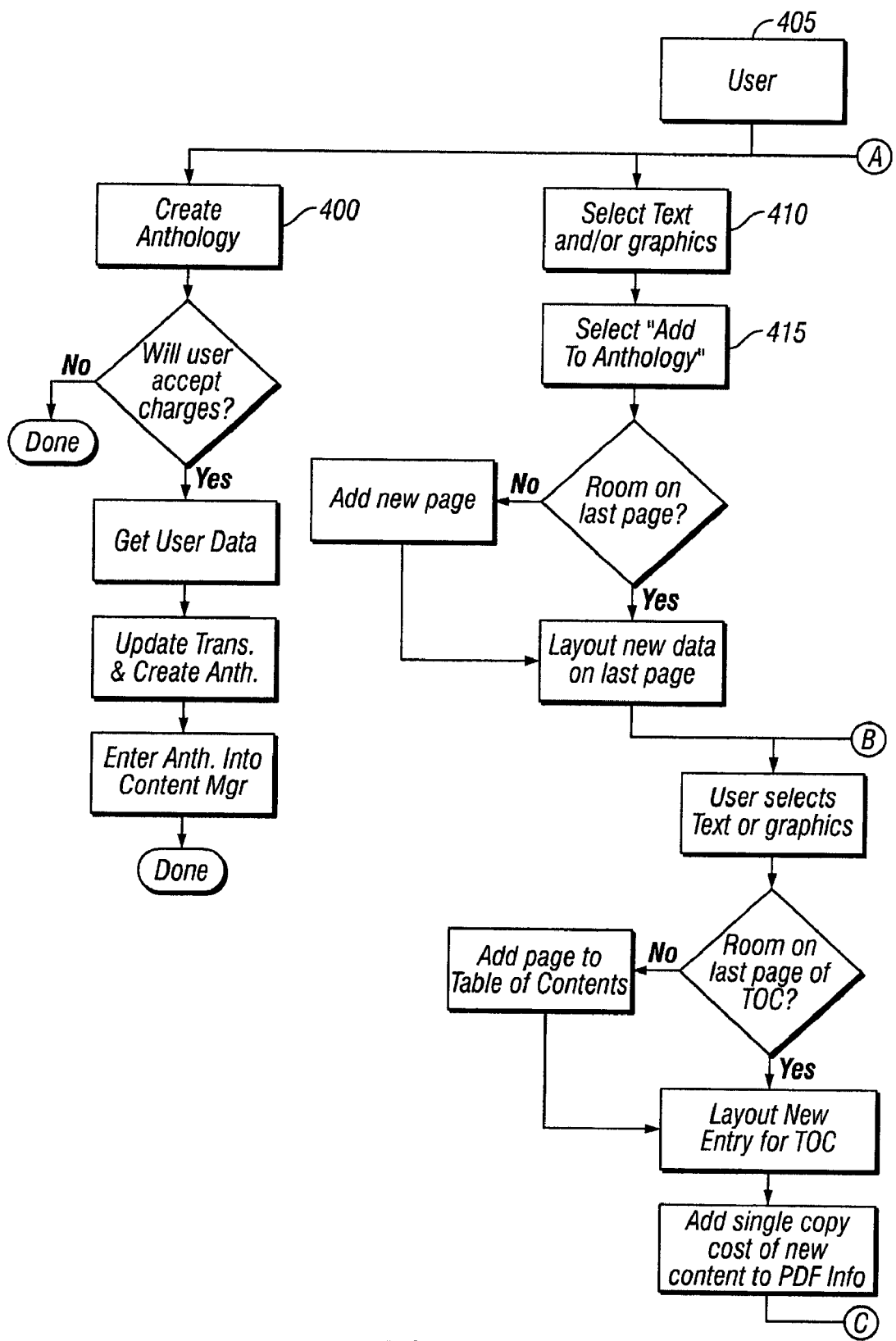
FIG. 4 is a flow chart illustrating a method for creating anthology documents according to a specific embodiment of the invention.
Figure 4:
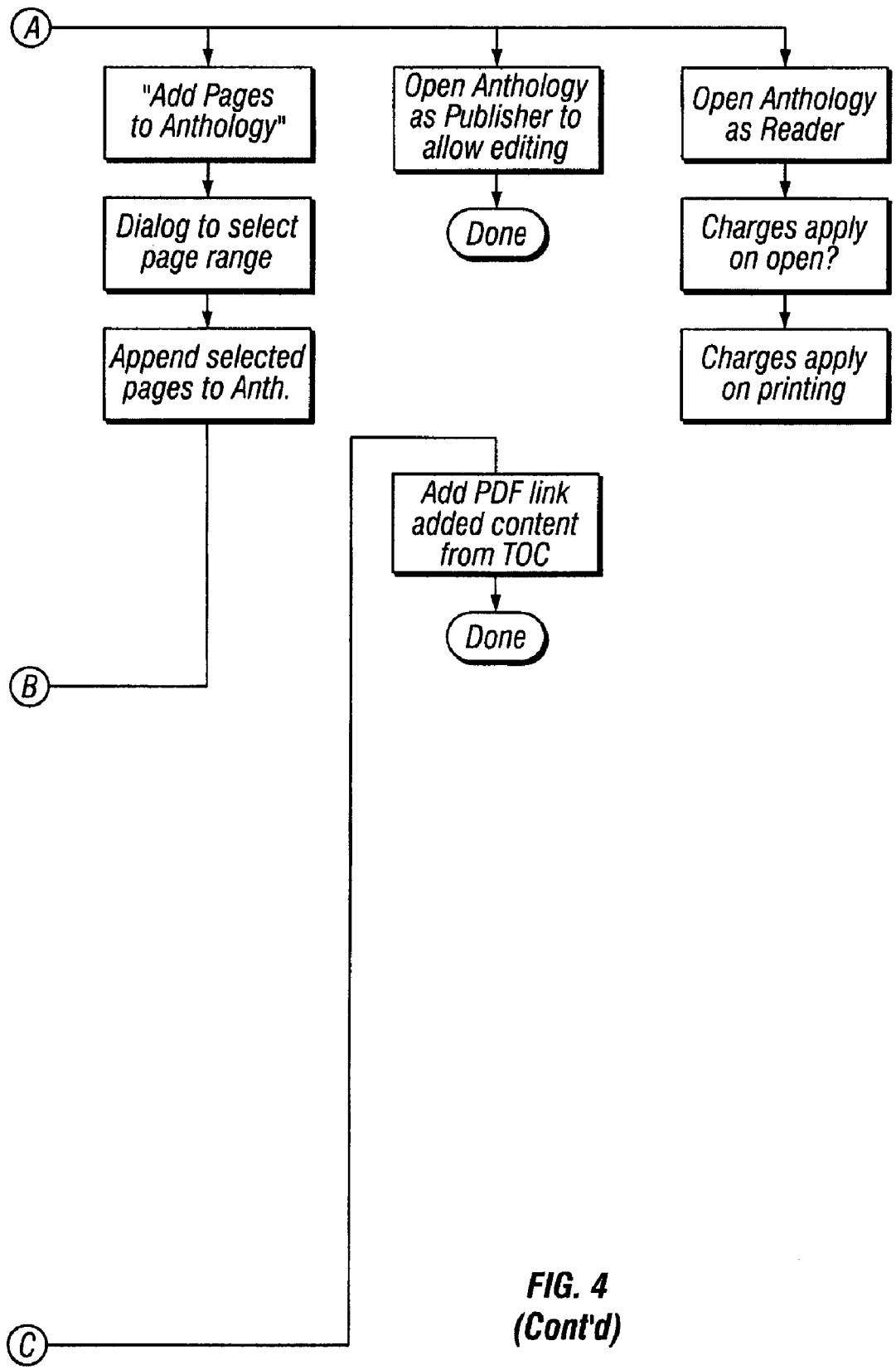

FIG. 4 is a flowchart illustrating a method for creating anthology documents 400 according to a specific embodiment of the invention. This is an optional feature that maybe provided in some embodiments of the invention. According to this embodiment, a user 405 interested in an anthology document, such as a course instructor, can selected multiple documents or portions 410 thereof to create an anthology 415. A single charge can be computed for performing actions on the anthology and discounts or special rates can be applied based on a group discount feature determined by the system administrator or by individual publishers.

1.6 Integrated Information Tools

Figure 5:
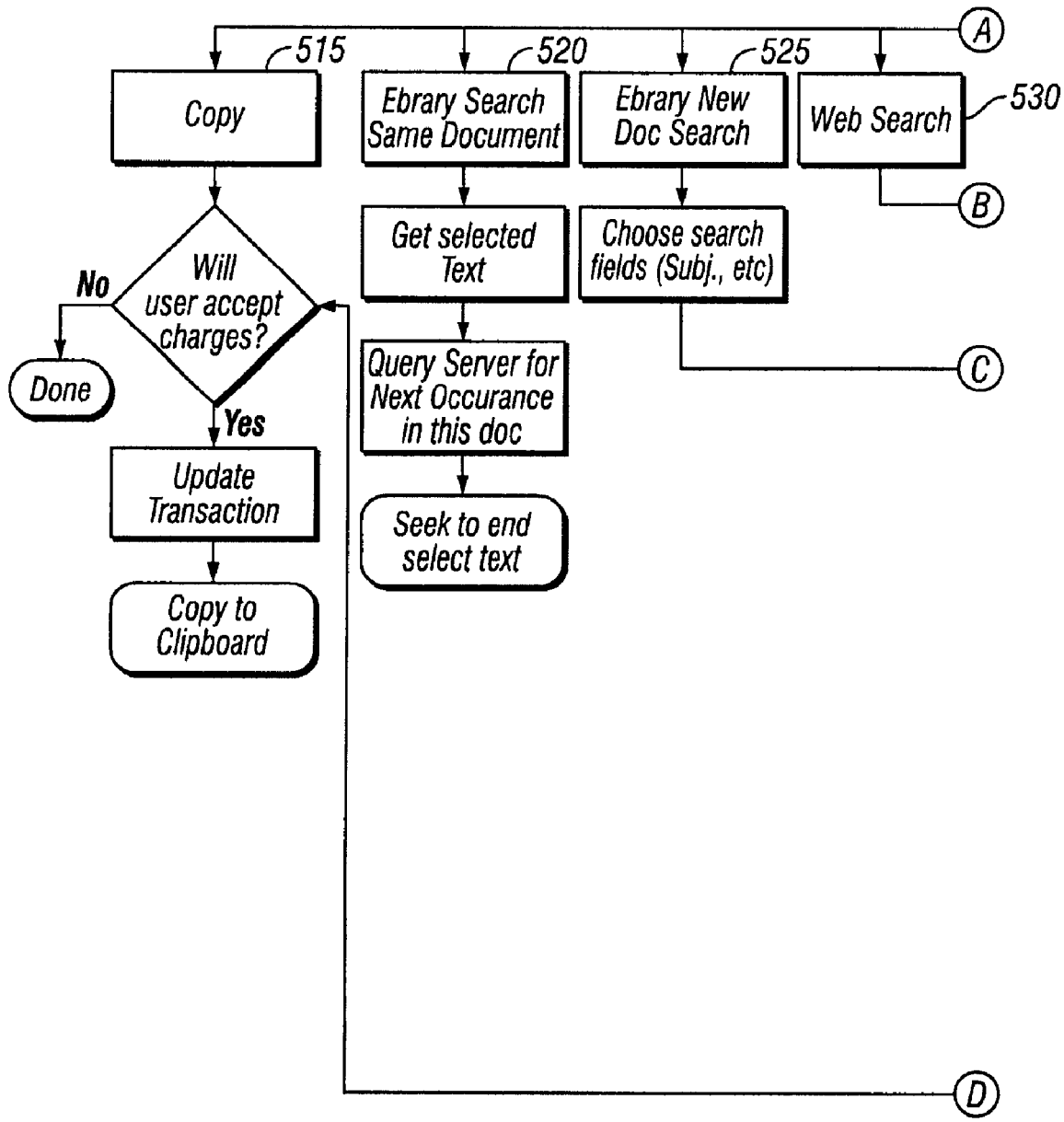
FIG. 5 is a flow chart illustrating a set of information tools integrated with user access to a document database according to a specific embodiment of the invention.
Figure 5:
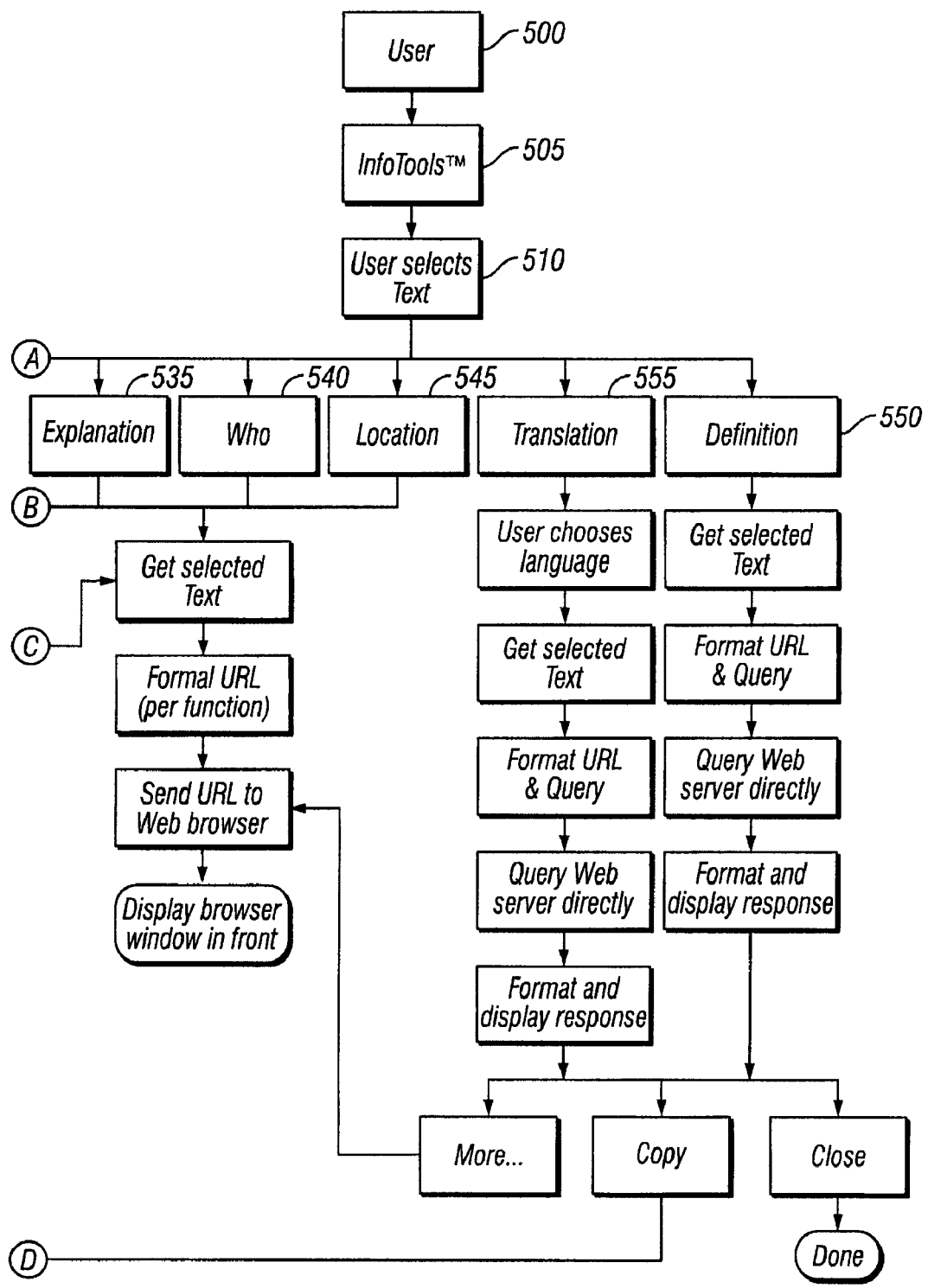

FIG. 5 is a flow chart illustrating a set of information tools integrated with user 500 access to a document database according to a specific embodiment of the invention.

As shown in FIG. 5, in this embodiment, from the user's 500 perspective, a number of information tools 505 are integrated with functions specific to the invention to provide the user seamless access to various information services. In this embodiment, a user can select text 510, and then, by indicating that text can access functions within the invention's database, such as paid copying 515, searching within the same document 520, or searching in the database within other documents 525. The user can also request information services that may be provided outside of the system of the invention, such as web searching 530, or web-retrieved explanation 535, personal information 540, location information 545, word definitions 550, or translations services 555. These features may be activated by user inputs as known in the art, such as keystroke commands, menubar selection, or context-sensitive menu selection based on clicking the selected text.

By integrating functions provided by the invention and web-based information services, the invention enhances usability.

1.7 Automatic Citation

According to one embodiment of the invention, the copy procedure can allow for an automatic citation function. This function retrieves bibliographic data stored in the documents or in the database at the server side and adds that data to the copied text. Bibliographic data may be formatted according to user options, such as using a different font, font effect, or size.

2. System Overview

Figure 6:
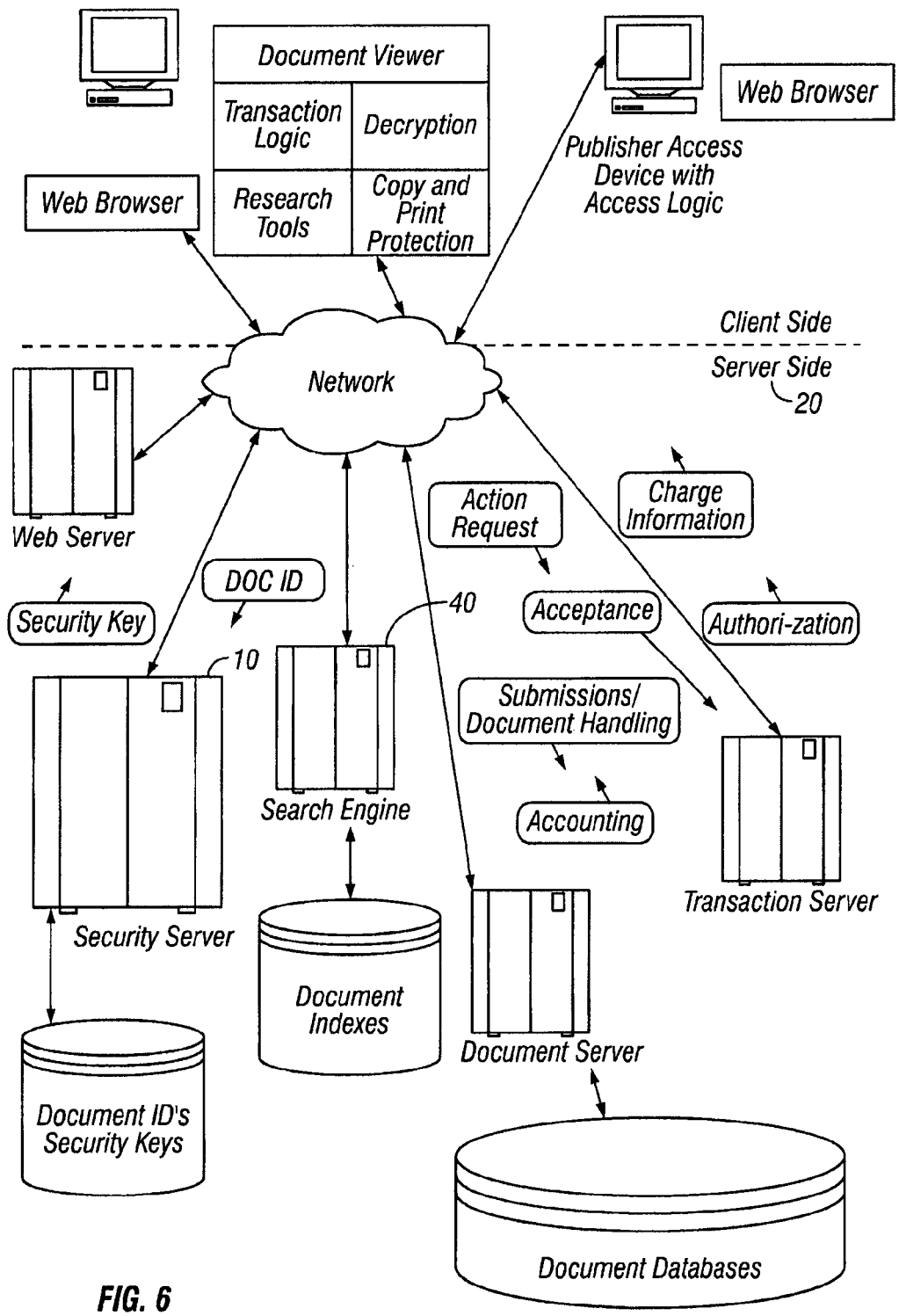
FIG. 6 is a block diagram illustrating an example system and system components according to a specific embodiment of the invention.

FIG. 6 is a block diagram illustrating an example system and system components according to a specific embodiment of the invention. For purposes of explanation, components of the system such as the security server 10, search engine 40, etc., are each shown as individual computing devices. It will be understood to those of skill in the art that this is a representation of one embodiment and that actual implementations can combine most or all of the server side 20 functional components onto a single powerful system or can divide individual functional components on to multiple cooperating systems. Each of the components shown in this and other figures, to the extent that it is not described in more specific detail herein, should be understood to represent logic components or logic devices that are well-understood in the art and are commercially available through third-party suppliers.

The present invention has thus far been described in terms of general methods and actions. The previous description is intended to be a full and complete description and is believed to be sufficient to allow an ordinary practitioner in the art to use the invention. It will be understood to those of skill in the art that the described invention can be implemented in a wide variety of specific programming environments, using a wide variety of programming languages and wide variety of file types.

What immediately follows are descriptions of example systems that can embody various aspects of the present invention. This following discussion is included, in part, in order to disclose a preferred mode presently contemplated for practicing the invention.

It is intended that the previous discussion and those claims directed to the previous discussion not be limited by examples provided herein. It is further intended that the attached claims be read broadly in light of the previous discussion, unless the claims specifically incorporate details described below. Where specific examples are described in detail, no inference should be drawn to exclude other known examples from the broad description of the invention or the language of the claims. It is therefore intended that the invention not be limited except as provided in the attached claims and all allowable equivalents thereof.

3. Document Format

Figure 7:
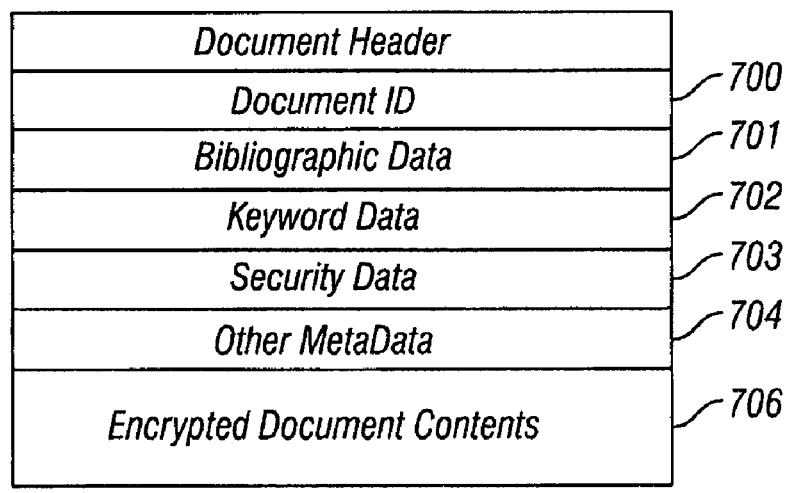
FIG. 7 is a block diagram illustrating an example document or format with security and encryption fields according to a specific embodiment of the invention.

FIG. 7 is a block diagram illustrating an example document or format with security and encryption fields according to a specific embodiment of the invention. Although FIG. 7 shows one example of a document format, it should be understood that the invention may work with many different document formats. The invention can work with a document format that allows for arbitrary metadata, where metadata is defined as extra content that is not normally visible in the document viewer. The invention uses the metadata feature to store values such as (but not limited to) Document ID 700, Bibliographic Data 701 such as Author, Title, Publisher, and Keywords 702, and security information 703 such as checksums and digital signatures. A number of well-known file formats can store data generally as shown in FIG. 7, including HTML, PDF, or Microsoft Word. The invention may also be used with a propriety file format. In PDF (Portable Document Format) metadata can be stored in the Document Info and Encryption Dictionaries.

As an alternative, a document format may already allow encryption, in which case in some implementations, metadata is not needed. Furthermore, when implemented with a custom or customizable viewer, a system according to the invention could store a document ID 700 in the URL or other locator string for the document, instead of in metadata, and store all other metadata 704 separately on the server using the document ID 700 as an access key.

The Encrypted Document Contents 705 can be stored in the normal content area of the document or the Encrypted Contents 705 can be stored in the metadata area.

4. Searching

In a further embodiment, a system as described herein is combined with advanced searching capabilities both in individual documents and in a document library. These advanced searching capabilities allow users to quickly find information that they may be interested in purchasing.

According to the invention, searched text is highlighted and documents will open to the pages that contain the text requested. Users will be presented with more clues as to what is contained within the document, and will be able to limit their searches within specific document types, or within specific subjects.

Users will also be able to reorder search results to better examine the content available to them. Re-ordering the search results by date, subjects, publishers or document relevancy, provides capabilities that empower users to find what they are seeking.

Additionally, users can perform searches within results of the previous search, allowing the user to reduce the documents to exactly what they need to find. These capabilities do not exist currently for general Internet use.

The present invention has thus far been described in terms of general methods and/or systems. The previous description is intended to be a full and complete description and is believed to be sufficient to allow an ordinary practitioner in the art to make and use the invention. It will be understood to those of skill in the art that the described invention can be implemented in a wide variety of specific programming environments, using a wide variety of programming languages and wide variety of file types.

What follows are specific implementation examples of various specific embodiments according to the present invention. This following discussion is included for the purposes of fully disclosing best mode details presently contemplated by the inventors for practicing the invention. In some instances, the following discussion includes innovative elements specific to a particular implementation that are claimed as separate inventions in the attached claims.

Where specific examples are described in detail, no inference should be drawing to exclude other known examples from the broad description of the invention or the language of the claims. It is therefore intended that the invention not be limited except as provided in the attached claims and all allowable equivalents.

5. Specific Example Implementations 5.1 PDF File Format and Viewer

In one specific embodiment, the invention uses the PDF file format for encoding textual/graphics documents. In this embodiment, the invention may also use a standard PDF viewer that allows plug-in modules, such as Adobe Acrobat viewer.

There is a vast literature on the PDF format, and in this embodiment the invention takes advantage of many existing features of PDF and defines extensions to the format, as allowed by PDF, to optimize operation of the invention. Some existing features of PDF that are particularly useful for implementing this embodiment are described below. For further information, the reader is referred to available publications, including http://www.adobe.com/products/docserver/main.html; *The Acrobat PDF Bible*, Ted Padova; *Portable Document Format Reference Manual*, ver. 1.3, Adobe Systems Incorporated; *Getting Started Using the Adobe Acrobat Software Development Kit (SDK)*, Adobe Developer Relations, and other documents available through www.adobe.com.

PDF is a file format used to represent a document in a manner independent of the application software, hardware, and operating system used to create it. A PDF file contains a PDF document and other supporting data. A PDF document contains one or more pages. Each page in the document may contain any combination of text, graphics, and images in a device- and resolution-independent format. This is the page description. A PDF document may also contain information possible only in an electronic representation, such as hypertext links, sound, and movies. In addition to a document, a PDF file contains the version of the PDF specification used in the file and information about the location of important structures in the file.

PDF and the PostScript language share the same imaging model, but there are fundamental differences between them. A PDF file may contain objects such as hypertext links and annotations that are useful only for interactive viewing. To simplify the processing of page descriptions, PDF provides no programming language constructs. PDF enforces a strictly defined file structure that allows an application to access parts of a document randomly.

Since Adobe Acrobat 2.0, it has become easy for third parties to add private data to PDF documents and to add plug-ins that change viewer behavior based on this data. A PDF producer or Acrobat viewer plug-in may define new action, destination, annotation, and security handler types. If a user opens a PDF document and the plug-in that implements the new type of object is unavailable, standard viewers will behave in a default manner. In one embodiment, the present invention adds private data as meta-data to PDF files and in a viewer plug-in adds new security actions and modifies existing standard actions, such as print and copy.

A PDF producer or Acrobat plug-in may also add keys to any PDF object that is implemented as a dictionary except the trailer dictionary. In addition, a PDF producer or Acrobat plug-in may create tags that indicate the role of Marked Content operators.

PDF files may be encrypted so that only authorized users can read them. In addition, the owner of a document can set permissions that prevent users from printing the file, copying text and graphics from it, or modifying it. The Acrobat core API uses RC4 (a proprietary algorithm provided by RSA Data Security, Inc.) to encrypt document data, and a standard proprietary method to encrypt, decrypt, and verify user passwords to determine whether or not a user is authorized to open a document. The code that performs user authorization and sets permissions is known as a security handler. The Acrobat core API has one built-in security handler. This security handler supports two passwords—a user password that allows a user to open and read a protected document with whatever permissions the owner chose, and an owner password that allows a document's owner to also change the permissions granted to users.

Third-party plug-ins can use the Acrobat core API's built-in security handler, or can provide their own security handlers to perform user authorization in other ways (for example, by the presence of a specific hardware key or file, or by reading a magnetic card reader.) A security handler provided by a plug-in can, if it chooses, use the Acrobat viewer's built-in dialog boxes for entering passwords and for changing permissions.

The standard encryption handler in PDF stores the encryption key within an encryption dictionary that also stores two passwords: one for "Open" (allows user to open the document for 'read-only') and one for "Owner" (allows full modification of the file). These passwords are checked before the encryption key is pulled out of the encryption dictionary and passed to Acrobat to allow decryption of the file. In a specific embodiment, the present invention encryption handler pulls the encryption key directly from the server based on a document identifier stored in the file and only allows opening the file for read-only, never for modification.

5.2 Other Document Formats

While the invention, in a specific embodiment, makes use of a number of features provided under the PDF format and in available PDF viewers, the invention may also provide access to documents in other formats. In particular, the invention can include in its document database executable files, and audio or video files, which generally are not encoded in PDF.

The invention can also be adapted for use with document formats, such as MS Word, which, as is known in the art, also allow for meta-data and allow for one or more associated passwords and encrypted files. Another possible format is an encrypted version of HTML, which also allows for meta-data.

For whatever document format is used, the invention uses a viewer that can work with code to handle aspects of security, copying, and printing. In addition, the standard document viewer(s) for a given format may be used with the present invention where the viewers allow for plug-in code to handle these aspects. Standard HTML viewers and other document viewers may also allow for the necessary plug-in code. For file types, where the standard viewers do not allow for the necessary plug-in control, the invention can use custom viewers.

5.3 Copy Text & Graphics Interruption

As known in the art, sets of routines in the Acrobat Software Developers Kit (SDK) handle object-oriented selection of objects. There is a structure for text and another for graphics. In accordance with a specific embodiment, the invention leaves the AVDocSelectionCanCopyProc alone, because the invention in this embodiment allows the user to try to copy. The invention, however, replaces the standard selection server for text and graphics, and further replaces the callback AVDoSelectionCopyProc in order to implement authorization and billing. Note that the term "selection server" has specific meaning within the Adobe Acrobat SDK, and readers are referred to that document for details.

5.4 Print Interruption

In a specific embodiment, procedures referred to as AVDocDoPrint( ), AVDocPrintPagesWithParams( ), AVDocPrintPages( ), and PDDocWillPrintPages( ) are invoked when a user wants to print a document. According to one specific example embodiment of the invention, these procedures are replaced and printing is performed generally according to the following steps:

1. If this is not a document encrypted by a system according to the invention, defer to standard print handler.
2. Display a platform-specific standard print dialog. In other embodiments, this may be replaced with a callback provided by the document viewer API (not currently available in Acrobat).
3. Get user parameters. These parameters can be checked for possible security holes (e.g. printing to a file) and the user's choice overridden for security in this embodiment. In a further embodiment, the invention will also be checking that the destination printer driver is an accepted one so that a user cannot hijack the data via replacing the printer driver with a dummy one, and printing can be aborted with an error dialog.
4. Get user account ID (login name and password). In the current embodiment, this is accomplished via a dialog. In future embodiments, it may be obtained from stored information or other sources (card key, etc.)
5. Verify user account information and retrieve price information (in one embodiment, retrieved via a servlet from an SQL database available remotely over the network. Parameters supplied to the database are document ID and page range; the former may come from data stored in the document info dictionary and the latter from a user selection or user input values into the print dialog GUI).
6. Present cost information to user.
7. If user declines the cost, abort printing.
8. If user accepts, send the accumulated information back to the transaction server to record and commit the transaction and await acknowledgement from the server. If acknowledgement is not received, abort printing.
9. Call the standard print handlers to do the actual printing.

6. Embodiment in a Programmed Digital Apparatus

The invention may be embodied in a fixed media or transmissible program component containing logic instructions and/or data that, when loaded into an appropriately configured computing device, cause that device to perform interpolation according to the invention.

Figure 8:
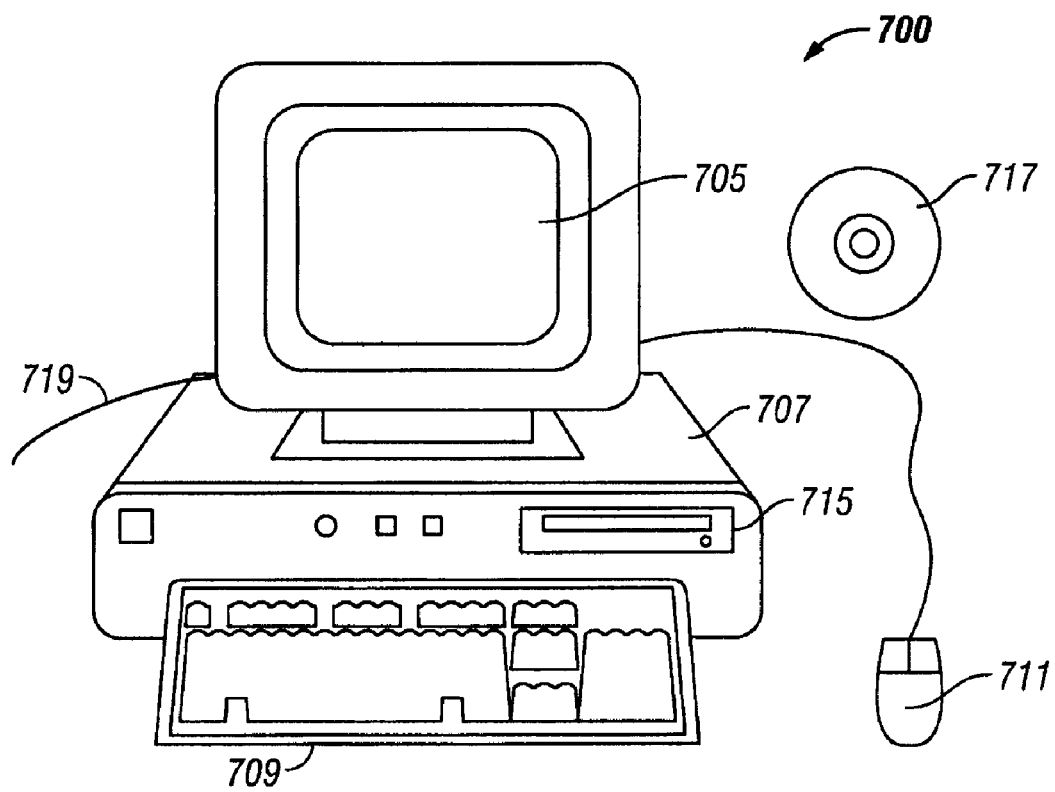
FIG. 8 is a block diagram showing a representative example logic device in which various aspects of the present invention may be embodied.

FIG. 8 is a block diagram showing a representative example logic device in which various aspects of the present invention may be embodied. FIG. 8 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as cameras, displays, image editing equipment, etc.

7. Example Screen Images

Appended to the specification, and incorporated herein, are several pages of example screen images from an exemplary embodiment. These images are presented as examples of program displays according to one specific system embodying the invention. As is known in the art, many variations are possible for interacting with logic systems, and the disclosure of these example images is not intended to limit the invention.

8. Conclusion

The invention has now been explained with regard to specific embodiments. Variations on these embodiments and other embodiments Will be apparent to those of skill in the art. The invention therefore should not be limited except as provided in the attached claims.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

Figure 9A:
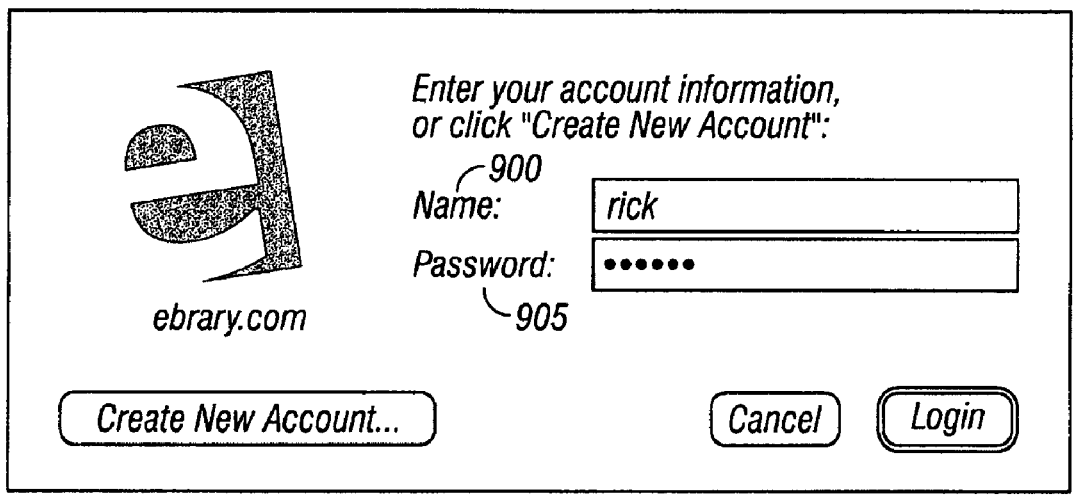
FIG. 9A is an example of a login dialog according to an embodiment of the invention.

FIG. 9a shows the user login dialog. Using this dialog, the user enters his/her Ebrary account name 900 and password 905. The invention will use this information to verify the user's identity and authorize transactions charged to the user's account, If the user has no account, clicking the "Create New Account" button will open a Web page in the user's browser that will enable the user to apply to Ebrary for a new account.

Figure 9B:
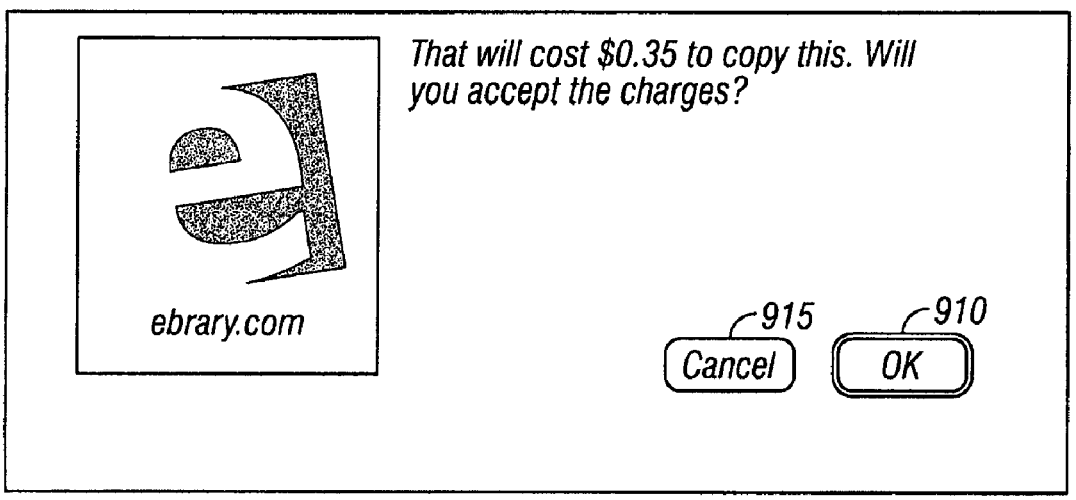
FIG. 9B is an example of a copy authorization dialog according to an embodiment of the invention.

FIG. 9b shows the authorization dialog for the Copy operation. The user is presented with the cost of a requested copy operation. By clicking the OK button 910, the user authorizes the charge to his/her account, and enables the copy operation to proceed. By clicking the Cancel button 915, the user declines the charge, and the operation is aborted: no copying takes place and the user's account is not charged.

Figure 9C:
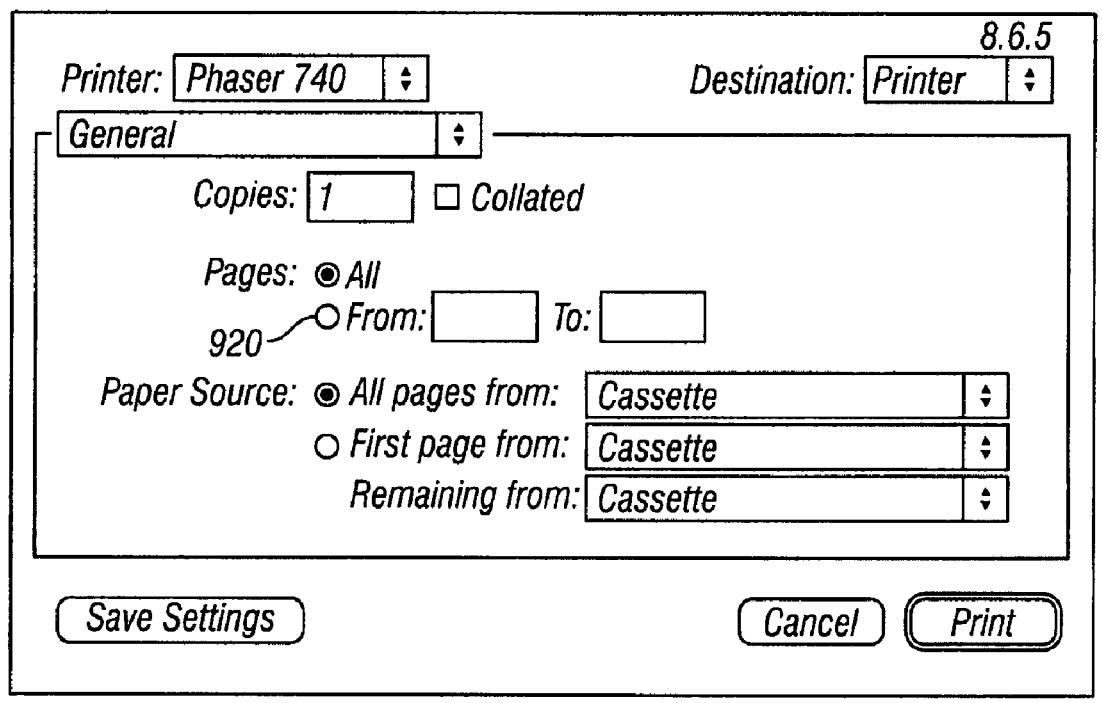
FIG. 9C is an example of a standard print dialog according to an embodiment of the invention.

FIG. 9c shows the standard print dialog for one of the systems that supports an embodiment of the invention. This dialog is provided by the operating system, not the invention; but in some embodiments it is presented as a result of the invention's direct request. The user will enter a page range 920 and other information affecting the requested print operation; the invention will harvest some or all of that information in order to help determine authorization and cost for the operation.

Figure 9D:
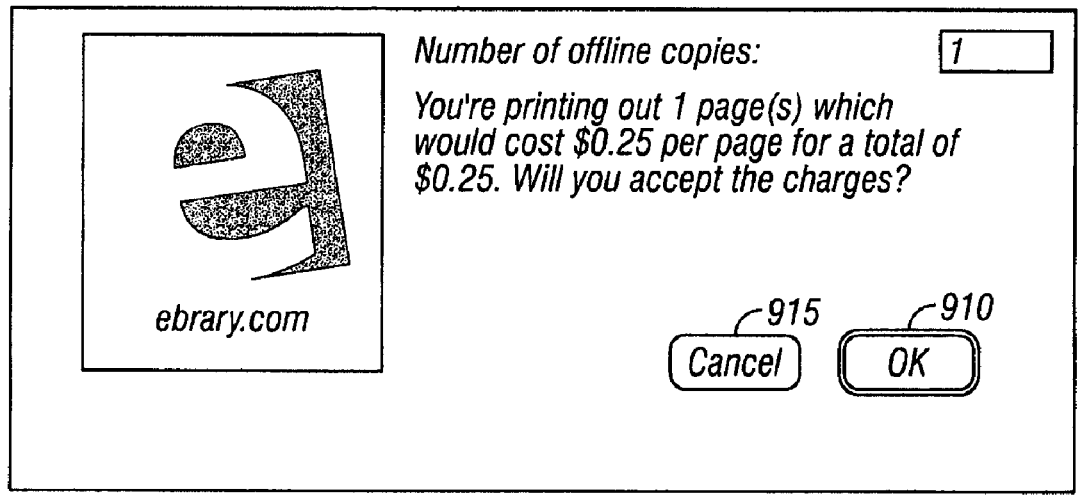
FIG. 9D is an example of a print authorization dialog according to an embodiment of the invention.

FIG. 9d shows the authorization dialog for the Print operation. The user is presented with the cost of a requested print operation. By clicking the OK button 910, the user authorizes the charge to his/her account, and enables the print operation to proceed. By clicking the Cancel button 915, the user declines the charge, and the operation is aborted: no printing takes place and the user's account is not charged.

Figure 9E:
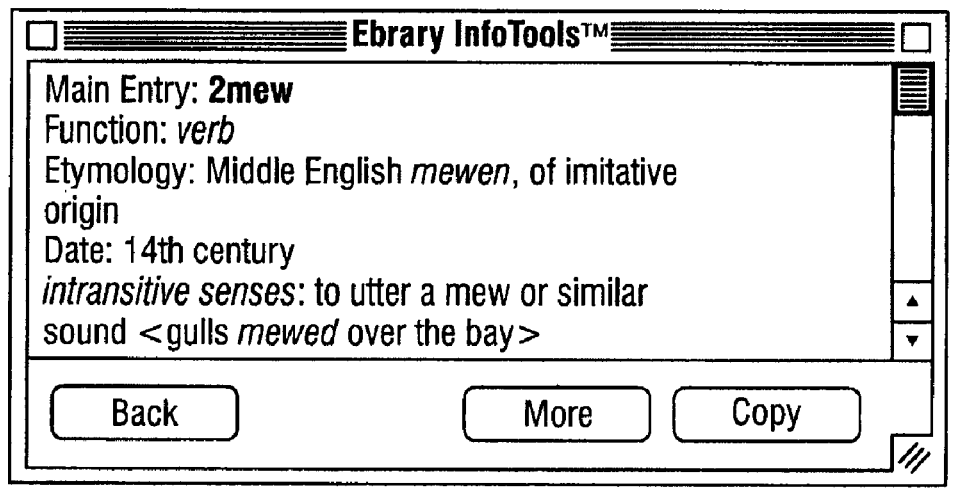
FIG. 9E is an example of an infotools window according to an embodiment of the invention.

FIG. 9e shows the InfoTools Window in which information requested by the user is sometimes displayed. In this picture, a portion of a word definition is displayed. This window may also be used to display other kinds of information, including but not limited to translations of selected text into other languages.

Figure 9F:
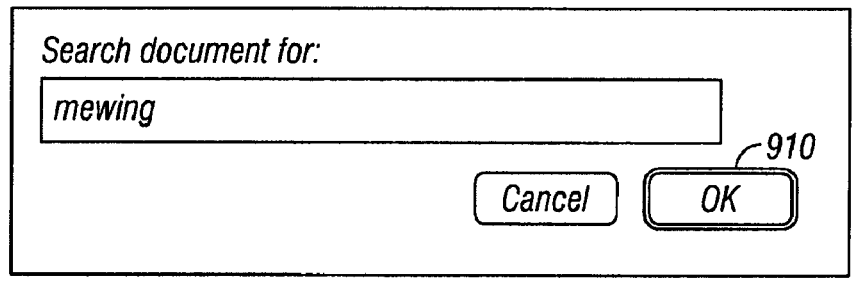
FIG. 9F is an example of a search document dialog according to an embodiment of the invention.
Figure 9G:
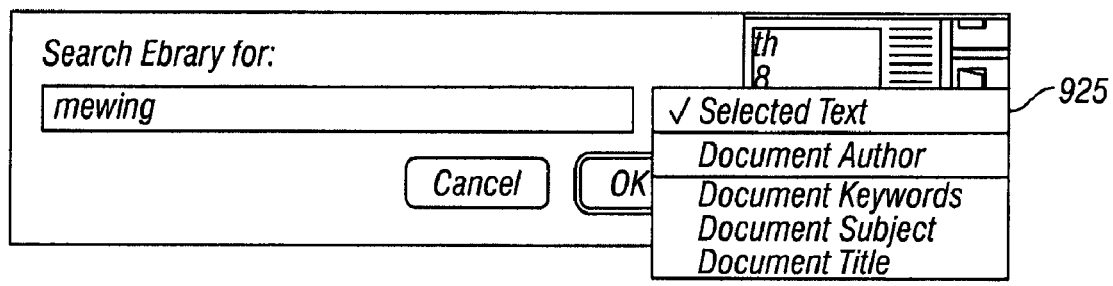
FIG. 9G is an example of a search ebrary dialog according to an embodiment of the invention.

FIG. 9f shows the Search Document dialog. Using this dialog, the user enters a text string to be searched for. When the OK button 910 is clicked, the invention queries its database and search engine via the network to determine the locations within the currently-displayed document where that text (or similar text) occurs. The reply from the server enables the invention to quickly display those locations.

Figure 9H:
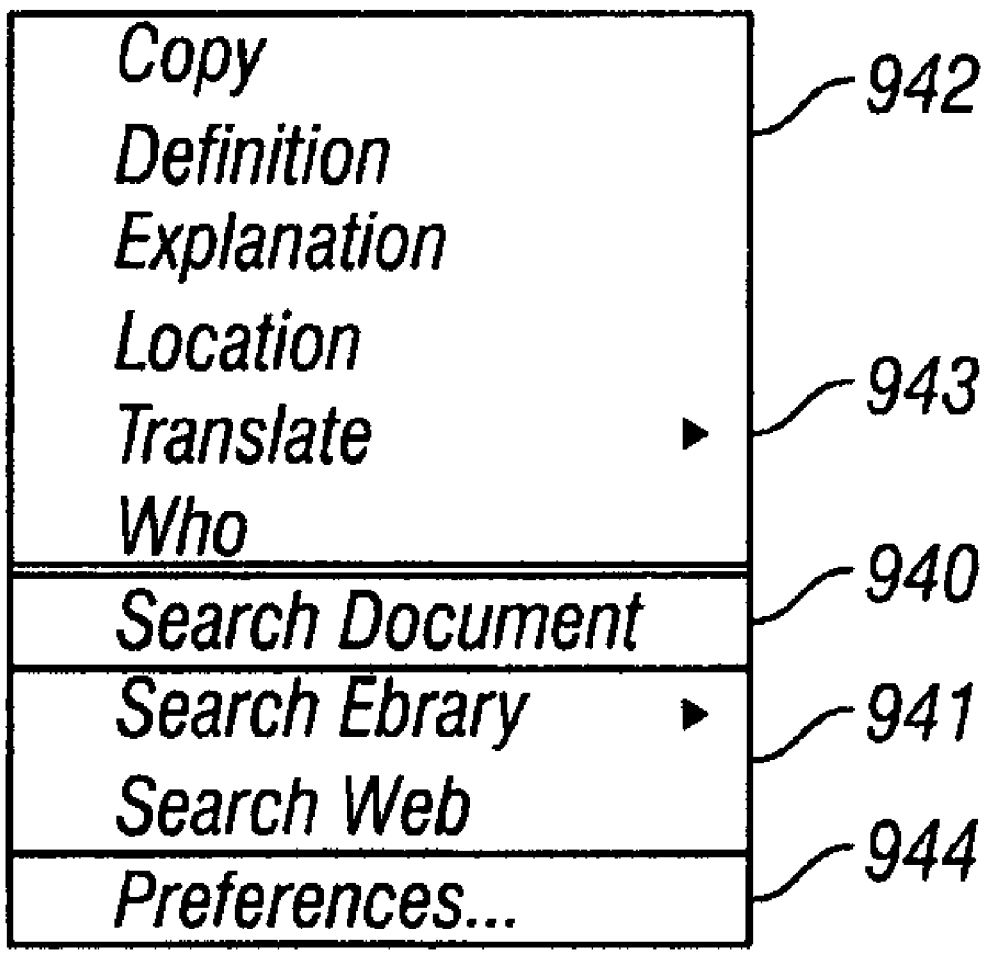
FIG. 9H is an example of an infotools menu according to an embodiment of the invention.

FIG. 9h shows the Search Ebrary dialog, with a popup menu displayed. Using this dialog, the user enters a text string to be searched for. The popup menu 925 allows the user to easily enter certain strings pertinent to the document including the currently selected text and the document's title, author, subject and keywords; however the user may also enter any arbitrary string. When the OK button 910 is clicked, the invention queries its database and search engine via the network to compile a list of documents in which that text (or similar text) occurs. The results of the search are displayed in the user's Web browser.

FIG. 9h shows a version of the InfoTools menu, which gives access to the InfoTools features while the user is viewing a document. The menu offers the user controls for performing searches 940, looking up information on the Internet 941, copying text 942 to the clipboard, performing language translations 943, and viewing and adjusting the user's preferences 944 with regard to the operation of InfoTools.

Figure 10A:
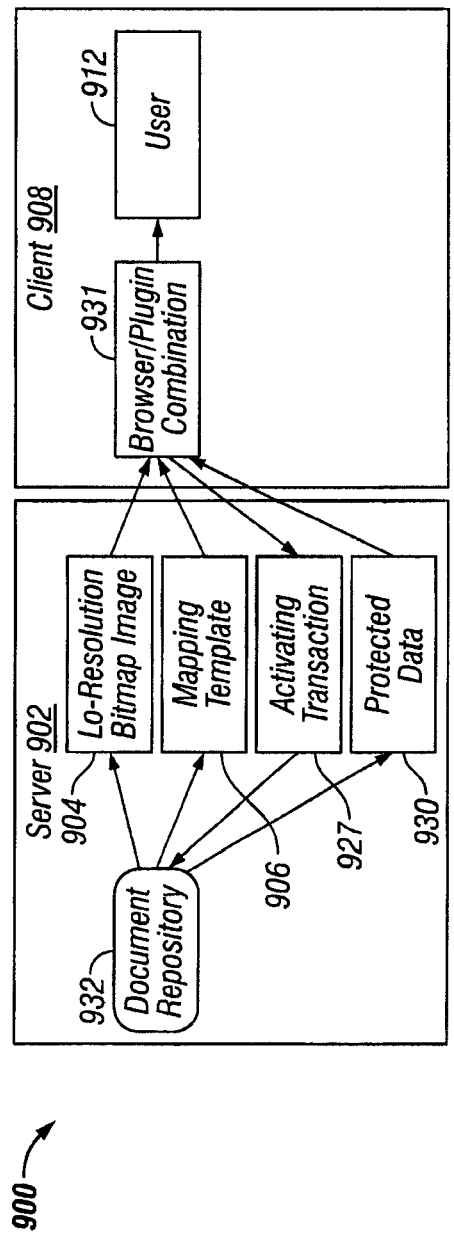
FIG. 10A is a block diagram of a system for providing secure information transfers using an improved technique for implementing the encryption function.

FIG. 10a is a block diagram of a system for providing secure information transfers using an improved technique for implementing the encryption function.

SUMMARY OF THE INVENTION

In accordance with a first aspect, the present invention provides a method of providing a secure transfer of an image over a network from server to client by selectively transferring from a server to a client a low resolution version of an image from a document stored in a data repository, mapping the image to determine a mapping template related to portions of the image and determining from the mapping template one or more portions of the image selected by action of a user at the client; and transferring the selected portions of the image from the server to the client.

In other aspects, the method may include determining a preferred order of the words in the selected portions, transferring words in the selected portions in the preferred order, utilization of a preferred order for interpretation by a human, one or more of the following functions, columnizing or regionizing, the additional use of a normalizing function, and/or transferring the selected portions to the client only if the client meets one or more authorization requirements.

Referring now to FIG. 10a, a preferred embodiment of the system that utilizes a low-resolution bitmap-image 904, visible to the user and a mapping-template 906, which may be invisible to the user 912 but contains information mapping the location of words or other points of interest on each page of the document, to provide the desired encryption function. The user 912 receives and may view the low-resolution bitmap-image 904 and utilizing information contained in the mapping-template 906, then select the locations of one or more words or objects on the low-resolution bitmap-image 904 as displayed, to facilitate, for example, highlighting desired objects in a manner similar to conventional word processing programs. The selected locations on the low-resolution bitmap-image 904 correspond to the mapping information contained in the mapping-template 906. The server then uses the selection of the one or more locations provided by the user, upon proper payment of fees if any, to provide high-resolution bitmap-images and/or text-representations of the selected objects or words to the user 912 for printing, copying or editing or other tasks. This facilitating secures encryption by providing only non-protected data to the user 912, the low-resolution bitmap-image 904 and mapping-template 906, prior to completing activating transaction 929 to facilitate transmission of protected data 930.

In particular, system 900 includes server 902, which sends low-resolution bitmap-image file 904 and mapping-template file 906 to client 908 via a network such as Internet. User 912 while viewing monitor is able to view low-resolution bitmap-image file 904 and interact with the displayed low-resolution bitmap-image 904 by, for example, highlighting object on page of document, represented by low-resolution bitmap-image 904 to select object which may include one or more words. This viewing is facilitated through a browser/plugin combination 931. Client 908 side software detects the highlighting performed by user 912 and sends selection information, corresponding to the location on the displayed bitmap-image of object to server 902. Server 902, upon receipt of the selection of object by user 912, and/or payment or confirmation of permitted access by user 912, sends high resolution bitmap-image or text-representation of selected object to client 908 for printing, copying, editing, saving or other permitted operations by user 912.

In this manner, protection of high-resolution bitmap-images such as bitmap-image and the text-representation contained therein is accomplished because only the low-resolution bitmap-image 904 is available to the user 912 until proper payment or other authorization is confirmed. Although mapping-template 906 is also sent to client 908 for use by user 912, the information contained in mapping-template 906 is related only the location of objects on specific pages of low-resolution bitmap-image file 904, but does not indicate the content at such locations.

Beyond the fundamental advantages of the system 900's ability to deliver PDF documents in a secure manner, the system design allows for the delivery of other document formats in the same manner, for example (but not limited to) HTML, XML, ASCII text, MS Word documents and other word processing documents. Any document on a computer including multimedia formats such as graphics, audio and/or video, is a candidate for delivery under the auspices of this system. System 900 may also be used as an integrated version control for documents.

Other types of payment strategies may also be used with system 900, such as all-you-can-eat, or time-based rental rather than micro-transaction based; Utilization of multiple search/storage databases to allow for the creation of custom collections of documents for clients/customers and customized web-sites and interfacing schemes to meet the varying requirements of differing clients/users such as conversion of data for use for audio books or reading to sight-impaired or translation of the material to alternate languages such as example Arabic or Japanese.

In an alternate embodiment, client side software may include the ability to determine the location of the selected documents in the secure document repository 932 based on desired text information and forward that information to the server. Such document location information may be determined by the server 902 again without making protected data 930 available to the user 912 prior to confirmation of an activating transaction 927 such as proper payment or other authorization.

Figure 10B:
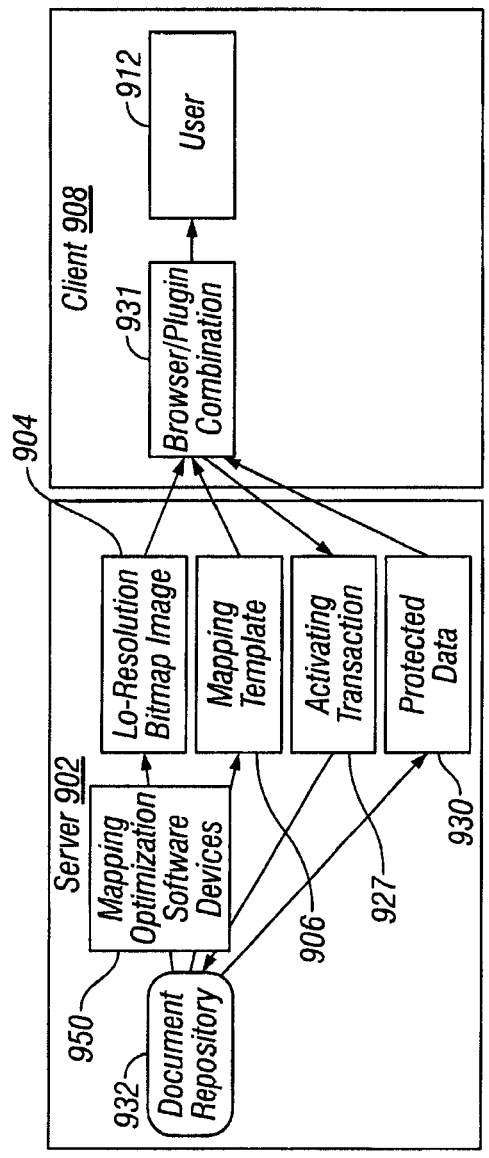
FIG. 10B is a block diagram of the system of FIG. 10A including the addition of a mapping optimization function.

Referring now to FIG. 10b, system 900 may be improved by the addition of mapping optimization software devices 950 to make the selection process more intuitive to user 912, for example, by simulation of the operations of a word processor so that multiple objects selected appear as a continuously selected or highlighted region in a left to right, top to bottom manner as is indicated by natural reading order. For example, in FIG. 11, user 912 may use a pointing device, such as mouse 711, to select the first few lines of text appearing on low-resolution bitmap-image 904, but due to the multi-column layout of the image, receive a non-intuitive selection of words, represented by the selected text contained in the first column & the second column, rather than just the first column. The intuitive and desired result is shown in FIG. 12.

In a further embodiment for these mapping optimization software devices 950, we are also developing applications of these technologies for utilization outside the context of the overall system 900 to allow for the same facilities to be made available in a stand-alone context such as when displaying PDF files in alternate consumer-off-the-shelf (COTS) applications such as Adobe Acrobat and Adobe Document Server. Thus enhancing the utility of these COTS applications.

Mapping optimization device 950 may include software for providing mapping optimization by normalizing, columnizing and regionizing in order to permit selection of text to work as expected in order to select words in their nature order.

Figure 13:
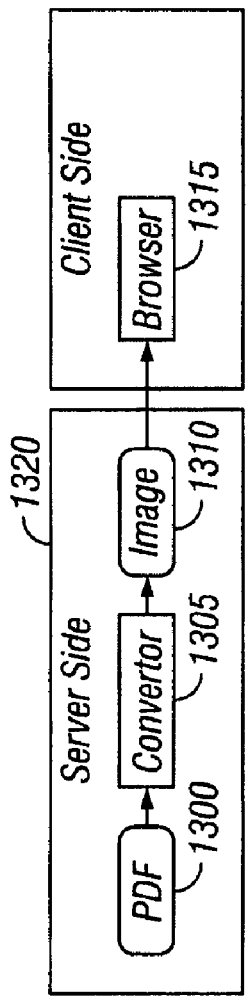
FIG. 13 is a block diagram of one implementation of the secure information transfer system.

Referring now to FIG. 13, the operation of a preferred embodiment can best be understood in light of EDF Display Protocol (EDF-DP). Utilizing PDF 1300 for the web-based delivery of content can be problematic for various reasons. The PDF 1300 standard does not include support for displaying single pages out of a larger document without first downloading the entire document, thus forcing a user to download an entire document before a single page can be viewed. This can be a very time-consuming undertaking, particularly on a slow connection. Also, since the PDF 1300 standard is designed to allow for the reproduction of absolutely identical copies of an entire document, there is a security risk in allowing users to view PDF documents 1300 over the web, because by giving them the ability to view the document, they are also given the ability to print and reproduce it in entirety and identical to the original, creating a risk of piracy and/or unwarranted disclosure of confidential information.

EDF-DP (Ebrary Document Format-Display Protocol) was developed to address both the single-page and security issues inherent in the PDF standard. System 900 uses a new display strategy which provides a methodology for displaying PDF-based content information on the web in a secured, page-by-page, real-time environment. In EDF-DP, rather than downloading PDF data 1300 for the purposes of displaying a page, the PDF 1300 may be passed through a converter 1305 that generates a graphic image 1310 which is preferably an exact representation of the page that was requested. This image is then forwarded to the user via the Internet and then displayed in the browser 1315 window.

This allows the user to view a given page, but addresses the issue of pirating/security, because rather than downloading the actual text information, only a low resolution image is provided. In particular, EDF-DP is a methodology for displaying single pages from PDF-based documents in a secure manner via the Web. This is achieved by displaying an image 1310 of a page from a PDF 1300 in the browser 1315 window, rather than the actual PDF data 1300, (as is done with Acrobat, the native PDF viewing system.) This approach keeps the environment secure as the text data for the document remains on the server side during display.

Since only an image 1310 is displayed in the browser 1315 window rather than the actual PDF data 1300, additional processing is needed to extend the functionality of the browser 1315 to allow for the image 1310 to be displayed in an environment similar to Acrobat reader, which is the native environment for the display of PDF documents 1300. This is provided via a browser 1315 plugin called "ebrary Reader." Ebrary Reader provides the same sort of functionality the user is used to seeing in Acrobat reader. These functions include (but are not limited to) Next/Previous Page, Go to Page, Zoom in/out, Table of Contents, Page number display, etc. This plugin complies with the NSAPI format for Netscape based plugins and is stored in the NPlnfotl.dll file in the browser plugins directory. The ebrary Reader is automatically installed the first time a user accesses a document on an ebrary-sponsored site. In an alternate embodiment of the ebrary Reader plugin we use Active-X as a delivery mechanism, which is stored in the ebraryRdr.ocx file and registered with the computer system's OS.

As noted above, EDF-DP is a methodology for displaying single pages from PDF-based documents in a secure manner via the Web by displaying an image 1310 of a page from a PDF 1300 in the browser 1313 window, rather than the actual PDF data 1300, (as is done with Acrobat, the native PDF viewing system.) This approach keeps the environment secure as the text data for the document remains on the server side during display. However, since only the image of the page is displayed, and the actual text version of the document remains on the server side 1310, additional functionality is required to allow the user to perform selection of text, as in a word-processing environment, for purposes of copying, highlighting, and/or performing additional searches and similar tasks.

In order to allow for the selection of text in the ebrary Reader environment, only one piece of additional information is required from the server, the coordinates of each word on the page. This can be represented by a straight-forward mapping of the pixels that represent each independent word. Since the graphic image representing the page is simply an array of dots (say, 800×1200 pixels), then the location of each word on that page can be defined by the bounds of the box of the pixels on the page which represent that portion of the image 1310.

Figure 14:
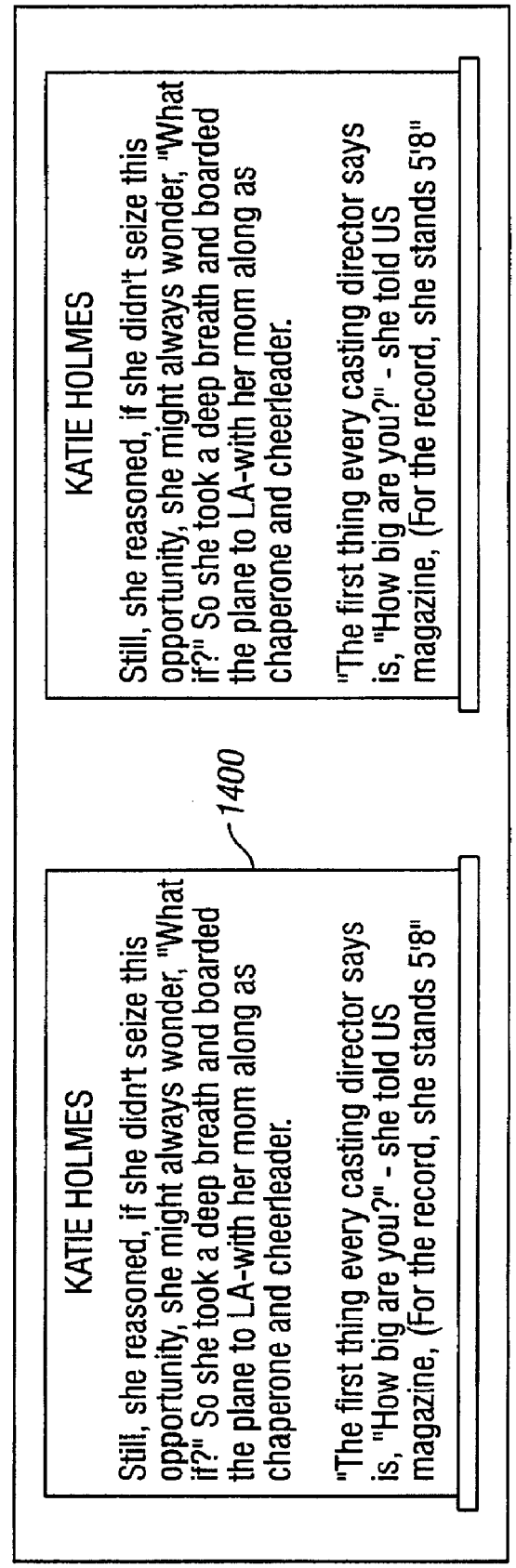
FIG. 14 is an illustration of a page of text in which a bounded area has been selected surrounding the word "reasoned."

Referring now to FIG. 14, in a 400×800 image (truncated for illustration), the upper left-hand corner of the word "reasoned" 1400 found on the first line is 57, 32—and the lower right-hand corner of the word is 88, 38.

Since each word on the page has a unique address which is constant, to support selection behavior in the viewer, the plugin only needs to know the bounds of the page, the number of words on the page, and the bounds of each word on the page. Thus, when the user points to a word on the page with the mouse and clicks, the plugin needs only search through the list of bounds of words on the page (called bounding boxes) to see if the location of the mouse click falls within any of those regions. If so, then the rectangle number is saved as the "selected" word number, and the associated pixels for that bounding box are inverted on the graphic, indicating that the word has been selected. Similarly, if a range of words is selected, then the first and last word in the range is saved, and all rectangles in that range are inverted.

Figure 15:
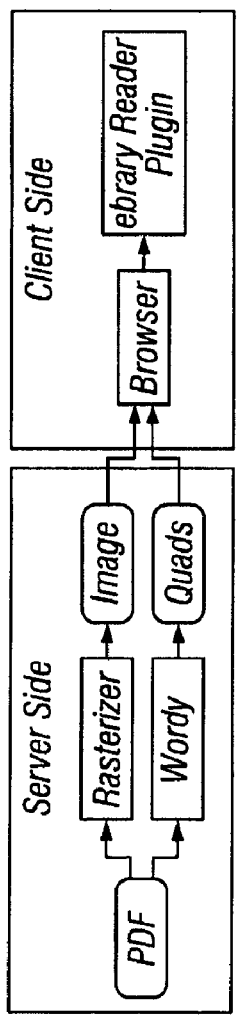
FIG. 15 is an illustration of the use of the "wordy" function to generate the mask or template.

As shown in FIG. 15, the server generates and provides the quad data to the client. This is done via a server-side 1500 process called "wordy".

Figure 16:
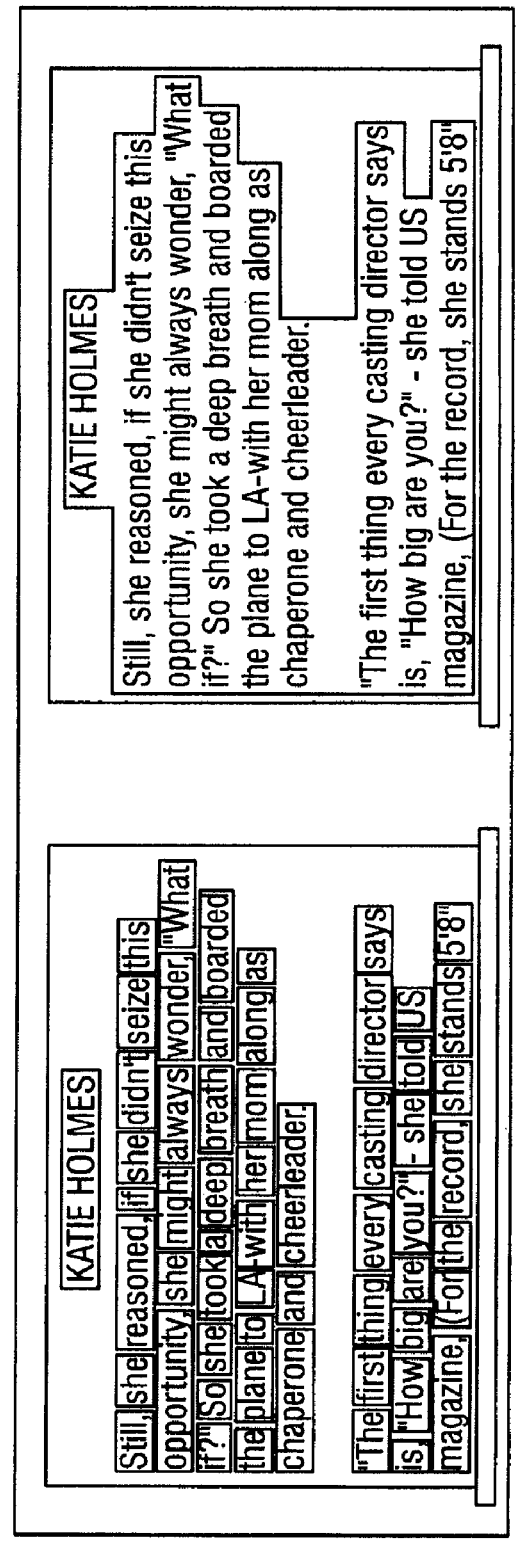
FIG. 16 illustrates the operation of the normalizer function.

Referring now to FIG. 16, the operation of the "normalizer" process is shown. The bounding boxes of words on the page, as described above, are designed to tightly define the location of a word. It cannot be assumed that the bounding boxes of sequential words will be precisely adjacent on the page. This leads to a problem in selecting text which we refer to as the "ransom note" effect, shown on the left side of FIG. 16 in which the bounding boxes for individual selected words are separated by white spaces.

To reduce or eliminate the ransom note effect, the quads are run through a process called the Normalizer, which checks rectangles and expands or contracts them so that they butt against each other vertically and horizontally. Though this process could be performed on the client-side rather than on the server side, performing the process on the client-side provides advantages, for example providing flexibility during debugging of quad data. In particular, the programmers are able to easily turn off the facility and inspect the actual quads as they are produced, rather than the finalized, adjusted or normalized versions.

In an alternative embodiment, the Normalizer could be placed on the server side and the plugin allowed to request either normalized or non-normalized rectangles if desired. This would necessitate either adding a server-side normalization capability to the process which provides the quads to the plugin, or the storage of both normalized and non-normalized quads.

Figure 17C:
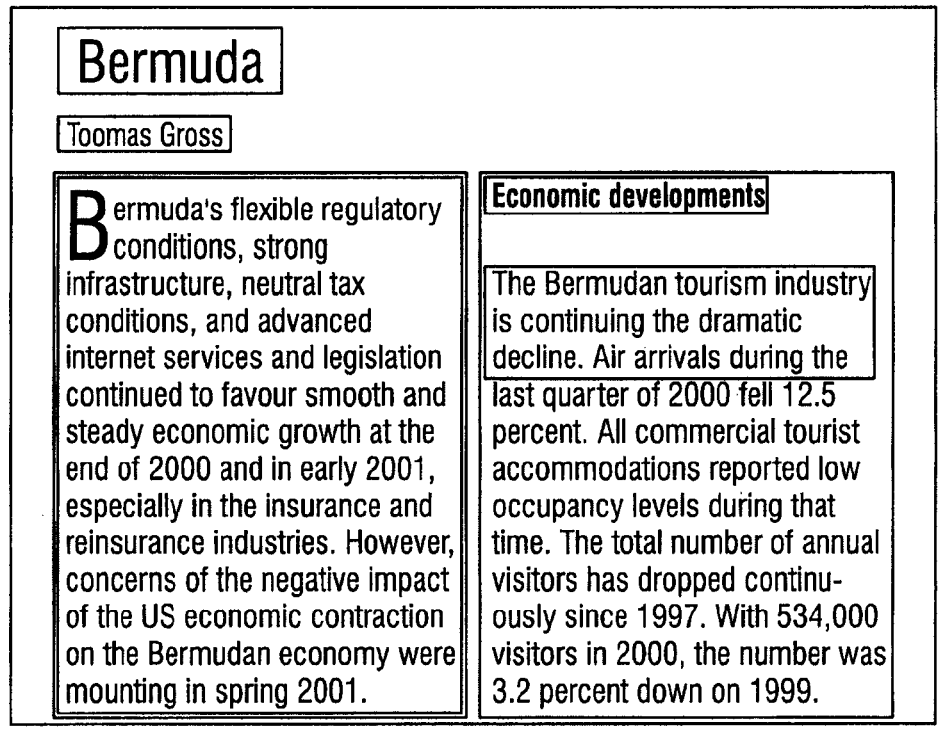
FIG. 17 illustrates the problems to be solved by operation of the columnizer function.

Referring now to FIG. 17, the operation of the columnizer function is shown. One of the limitations with the use of vector based standards, such as PDF, is that the order in which the viewer would read words on the page is not necessarily the same as the order that the words would appear in the PDF file. That is to say, that while each word in the PDF does have a discrete location on the page and with regard to other words, it is not always the case that the order of the words which appear in the document is the same as the order in which a user would read them on the page. For example, the phrase "Mary had a little lamb" might be encoded in the PDF as "lamb.Mary little had a."

This effect is due to artifacts in the original programs which generate the PDF files and which each have their own unique strategies for formatting a printed page. Since it is a computer rather than a user which actually generates the PDF files, the order of words is much more likely to be that which makes sense to a computer or printer, rather than the user.

One classic case of this phenomenon occurs when multiple columns of text appear on a single page. For example in the following case the words "Economic Development" in the title on the second column actually appear between the words of the first and second rows of the first column.

Thus, if the selected text above were to be copied, the returned text would be "Bermuda's flexible regulatory condi- Economic Development tions, strong infrastructure, neutral tax conditions, and advanced The Bermudian tourism Industry is contin- Internet services and legislation continued . . . " Notice that the text is copied from left to right, top to bottom, without consideration of the columns which appear on the page.

The preferred result would be to have all the words in the first column listed first, then the second, resulting in "Bermuda's flexible regulatory conditions, strong infrastructure, neutral tax conditions, and Internet services and legislation continued . . . " etc. Additionally, the undesired behavior of joining the lines between the columns during selection (caused by the Normalizer processing as though the words appear on a single line) needs to be eliminated. The proper section state appears in FIG. 17*b*.

In order to reorder the words on the page it is necessary to determine where the blocks of text on the page are placed, that is, the locations of the bounding boxes of the columns on the page. There are 4 main regions of text, as shown in outlined fashion in FIG. 17*c*.

Referring now to FIG. 18, the identification of the appropriate text regions can be accomplished using the same information that the ebrary Reader uses to facilitate selection behavior, the overall size of the page and the bounding boxes of all words that appear on the page. Rather than focusing on the location of the words on the page, in a preferred embodiment, the spaces between the words are used. In particular, a mathematical translation of the data, called an orthographic projection, is performed to identify the regions of whitespace in one direction or another based on the density of the data.

An orthographic projection is a reduction of order of magnitude of sample of data, or simply stated, a "shadow". For example, consider a ball placed in front of a lamp, casting a shadow on the wall. The ball is spherical, a three-dimensional object, while the shadow on the wall is a circle, a two-dimensional object. The shadow is a 2 dimensional representation of the three-dimensional ball. By doing a similar translation of the two-dimensional "quad" data which identifies the word regions on the page, a one-dimensional vector is obtained which represents the density of words on the page in one direction or another (horizontal or vertical).

Figure 18A:
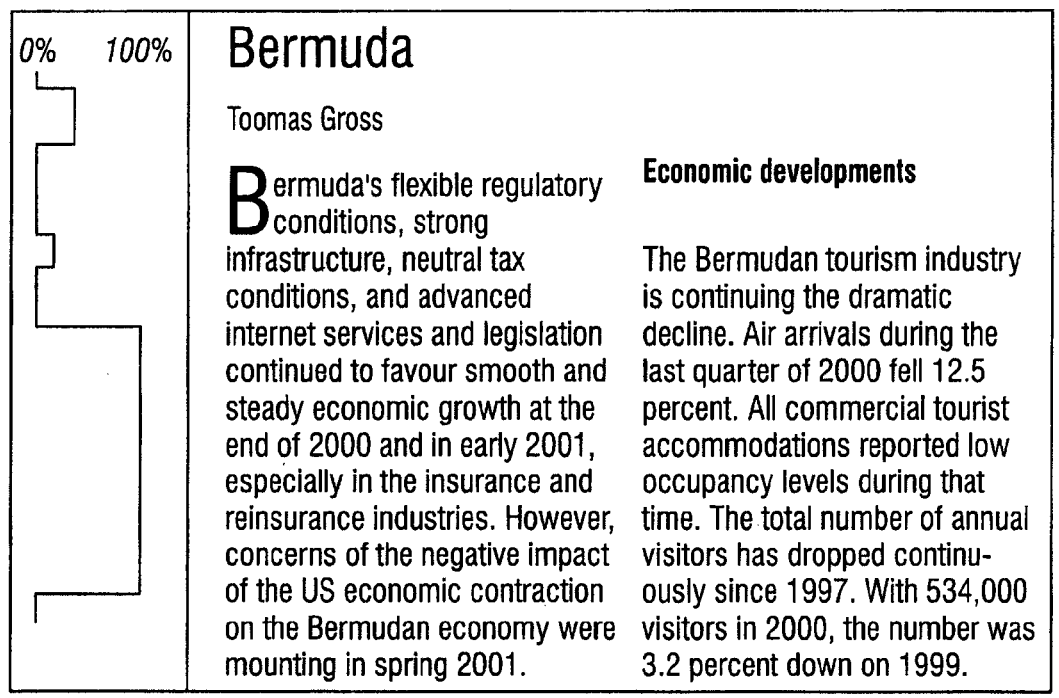
FIG. 18 illustrates the operation of the columnizer function.

The translation is executed by first creating a linear array of integers the same size as the height of the page and setting each value of the array to zero. The all of the word-rectangles on the page are reviewed to determine and save the width of each rectangle in each of the corresponding y values for that rectangle. So, for example, if a rectangle has an upper left-hand corner of 5,10 and a lower right-hand corner of 20,25 then values 10-25 in the vector would each be incremented by the width of the rectangle, which is 15 (20-5). This is done for all rectangles on the page. To find the main vertical regions of the page, one need only scan the vector array looking for regions of "zero" values, as these indicate the vertical whitespace on the page. This translation is illustrated in FIG. 18a with the resultant vector shown on the left edge of the drawing.

Figure 18B:
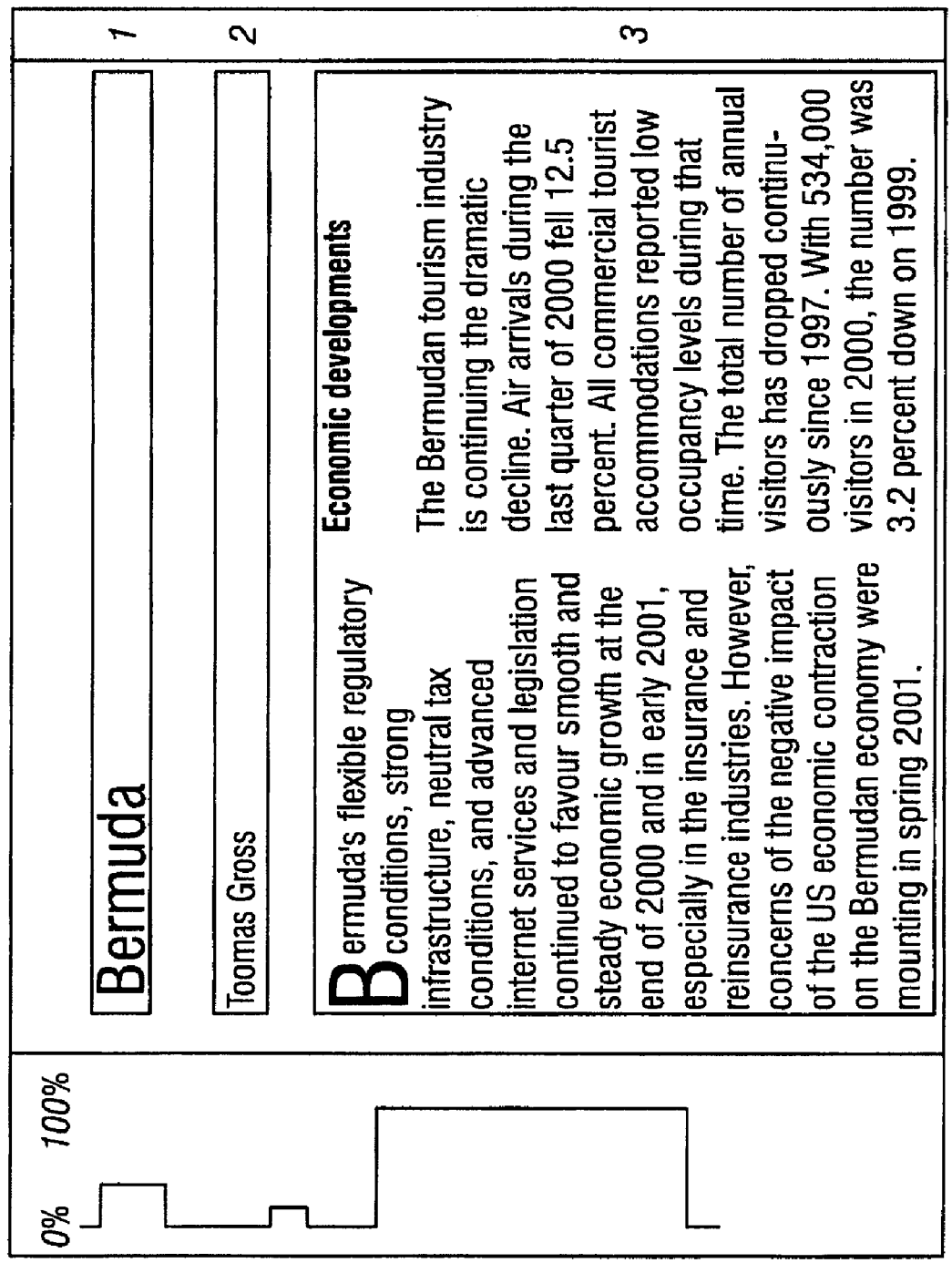

Using the ranges of zero values as indicators, the page may be broken up into three vertical subsections as shown in FIG. 18b.

Figure 18C:
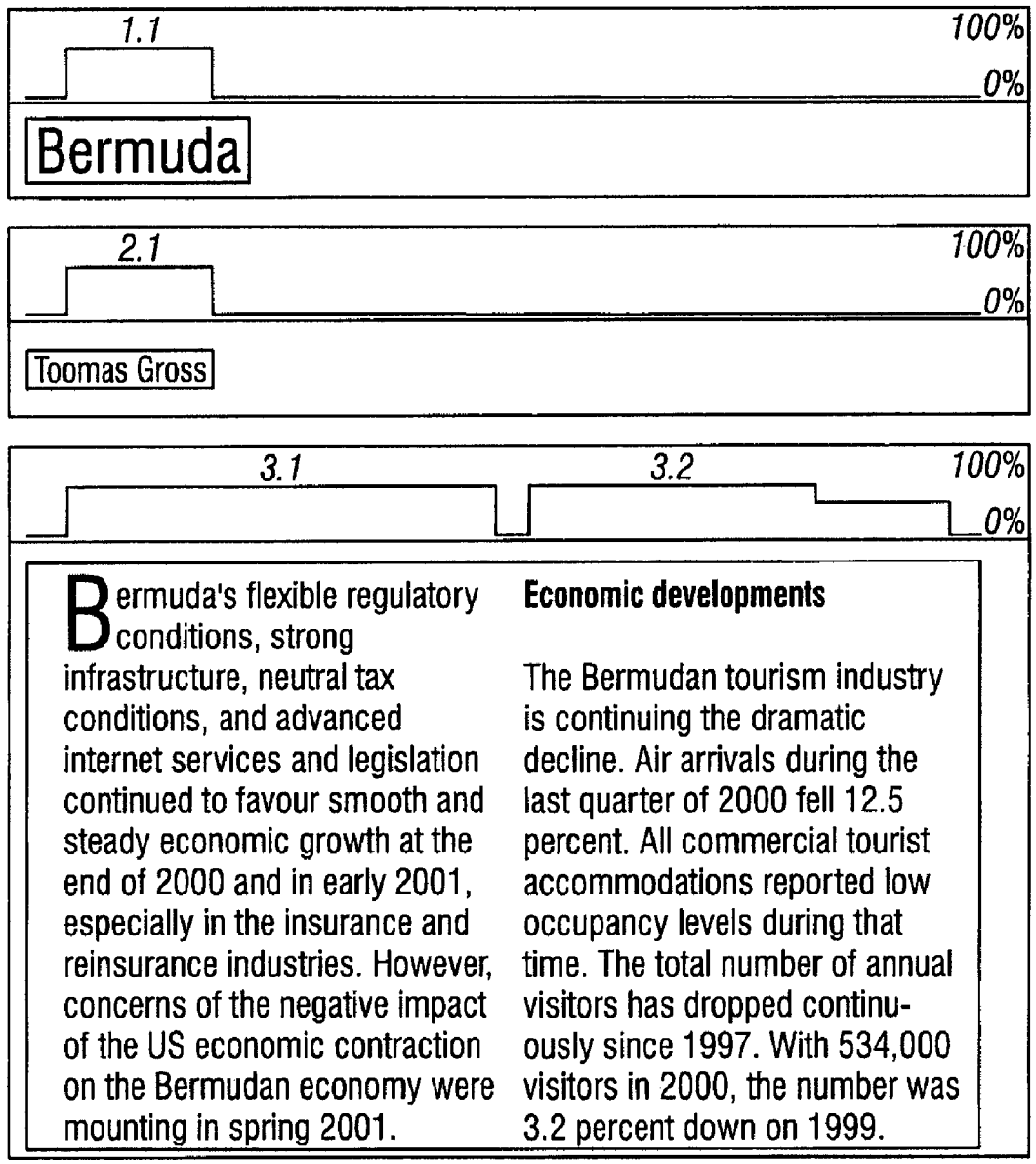

These three regions of the page may then be placed in a list and the process may then be repeated time in a horizontal manner on each of the sub regions as shown in FIG. 18c.

The result of these operations identifies a total of 4 regions found on the page, as shown in FIG. 18d.

Referring now to FIG. 19, the process may then be repeated recursively (vertical then horizontal) placing newly found regions in a tree structure as children of their parent region until no new regions are found, which indicates that all regions have been found.

Once all regions have been identified, the tree is traversed and any identified terminal node (nodes for which there are no children) can be considered a valid region. As each region is found, the words on the page are checked to determine if they fit within that region, if so, the rectangle is moved to the front of the list of rectangles, in front of those not checked or not in the region, but subsequent to those which have been checked. This succeeds in reordering the words on the page so that the words in the first region appear first (in the same order in which they originally appeared within the region, then those in the second region and so on. This reordering of words provides the desired selection behavior described previously.

Figure 20A:
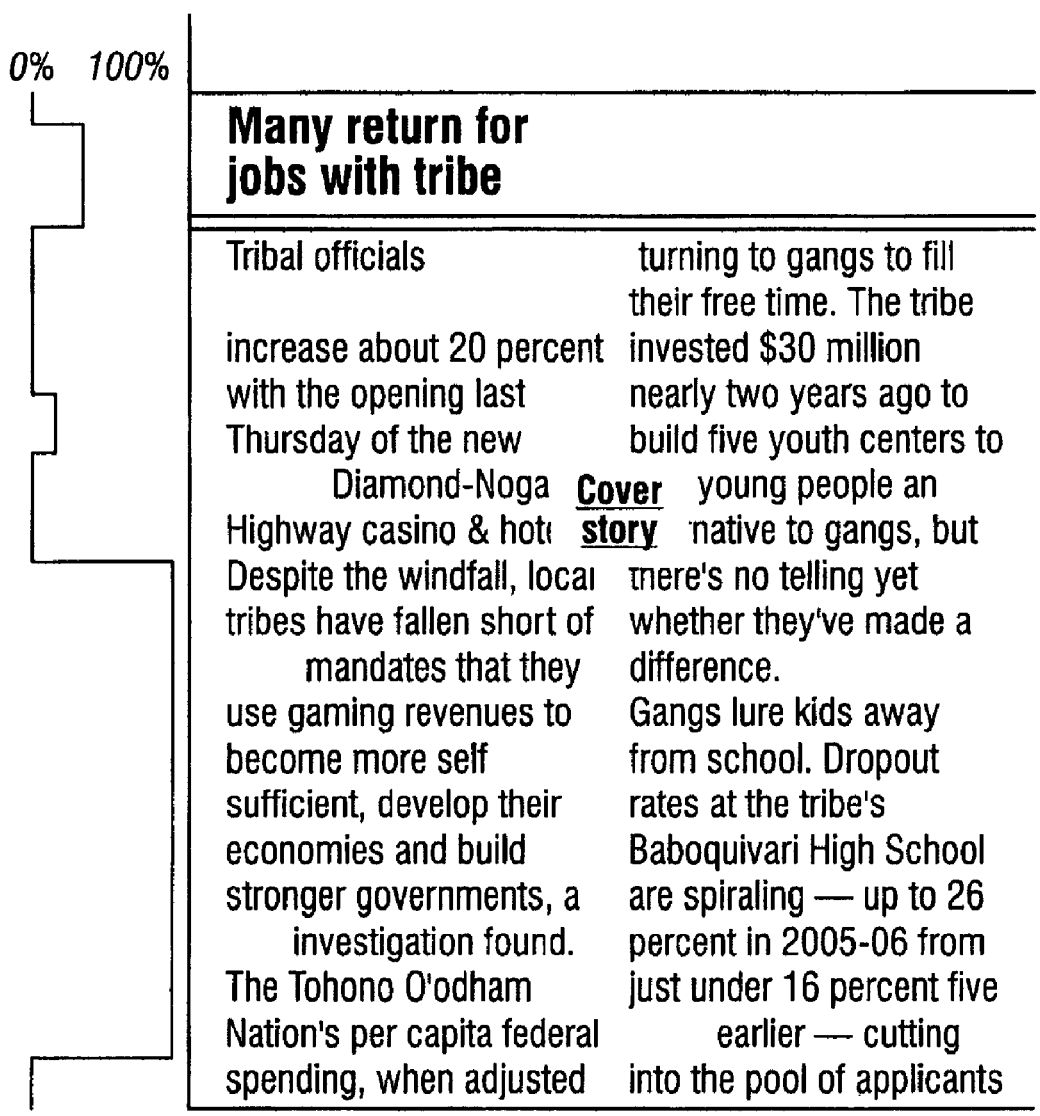
FIG. 20 illustrates an example of the problems that operation of the regionizer function may be used to correct.

Referring now to FIG. 20, the problems that operation of the regionizer function may be used to correct. In particular, in FIG. 20a, the Columnizer process may fail to find all regions on complicated pages such as those found in periodicals (magazines, newspapers, etc.)

Here the algorithm will successfully find the first two vertical regions on the page, but will fail to find the columns in the lower region, due to the call out labeled "Cover Story" in the middle of the page, because these two words will read as a small bump in the vector, not a true range of zeroes.

The correct regioning for the example described with respect to FIG. 20, should look like the illustration shown in FIG. 21, with four regions identified, rather than the two found by the columnizer. And for consideration, the much-more complicated full-page example from which the simpler example was pulled is shown in FIG. 22.

Figure 22:
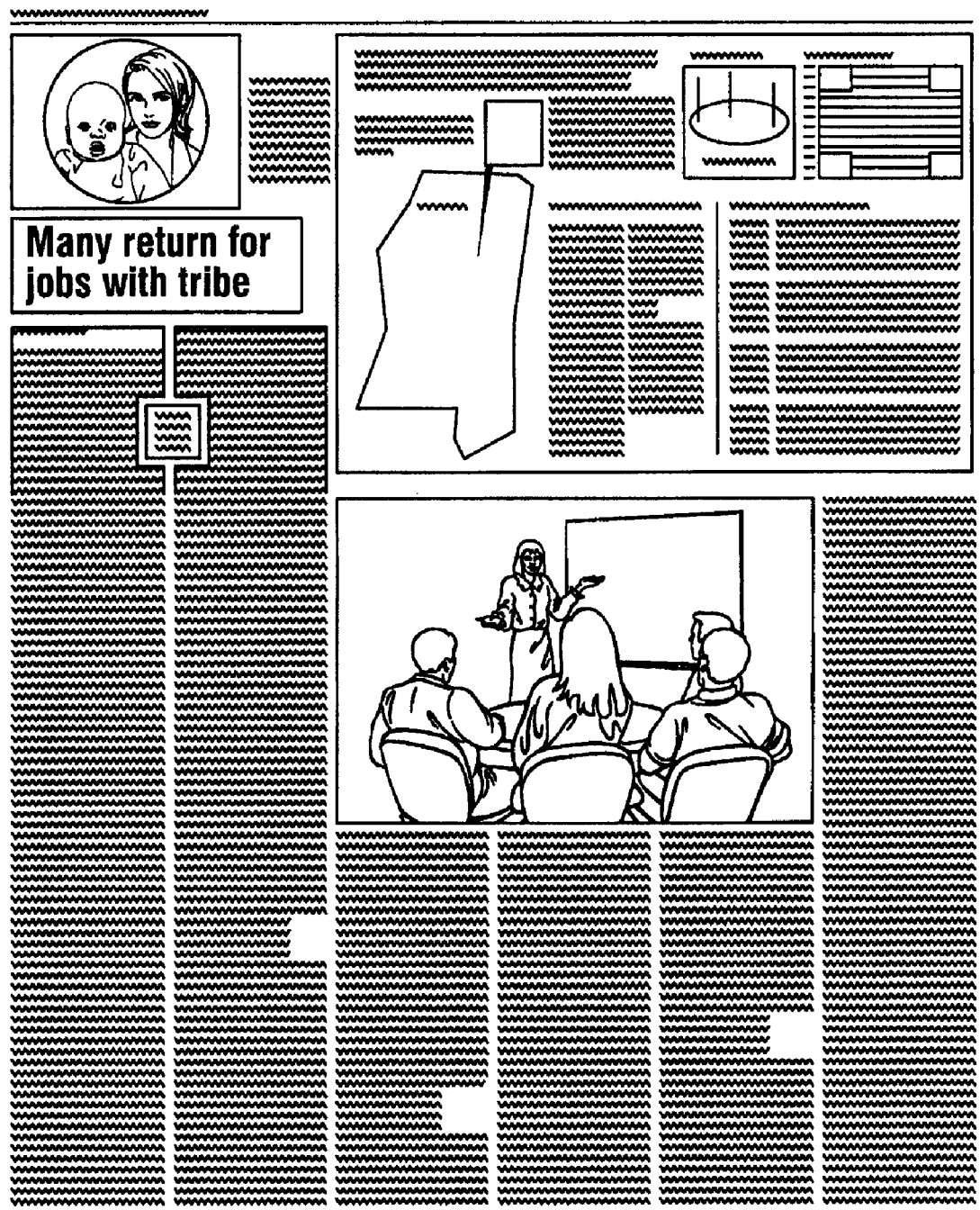
FIG. 22 illustrates a full page view of a page from the example used in FIGS. 20 and 21.
Figure 23:
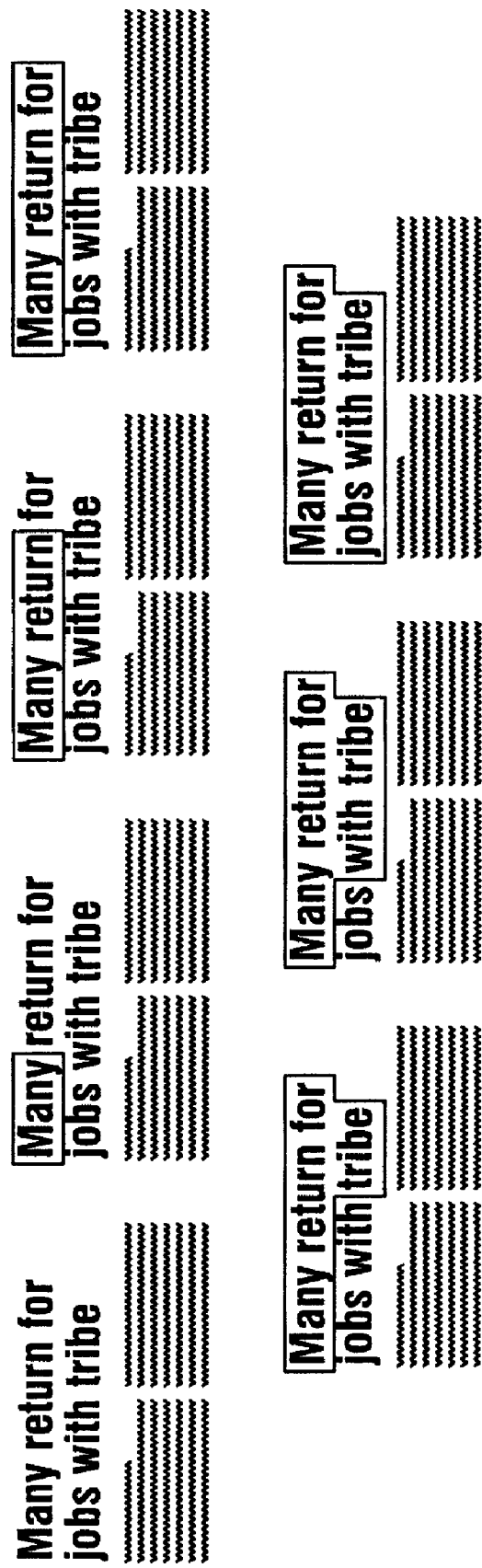
FIG. 23 is a series of views of a portion of the example page showing the operation of the buddySearch function.

Referring now to FIG. 23, the regions on a complex page as shown in FIG. 20-22 are identified using a different approach. Rather than looking for whitespace on the page, groups may be formed from areas having words of similar font size in close proximity, called herein as "buddies". By searching for words that have buddies with similar characteristics, the regions naturally identify themselves, regardless of complexity of shape or layout. This is performed by a function called buddySearch.

The operation of the buddySearch function, as illustrated in the upper left hand corner of FIG. 23, starts with the most upper-left handed word, "Many". This first word is selected to indicate that the word has been checked in a special datastructure that is used by the buddySeach process. Thereafter, the other words on the page are evaluated to determine if any is just to the right of selected word "Many", which is also of a similar height (which indicates the word is of a similar font size.) In this case, there is a word just to the right of "Many" which has these characteristics, the word "return". The information that "return" lies to the right of "Many" and that "Many" lies to the left of "return" is preserved in a data structure. The buddySearch process is then used recursively, starting on the word "return" this time.

In this iteration, the word to the right of "return" is processed and indicates that the word "for" has the desired properties. This information is preserved and then the buddySeach process is used again beginning with the word "for". The process indications that there is no word to the right of the word "for" which has the desired properties. The buddySeach process is used on the next line below and determines that the word "tribe" has the desired properties. This information is stored and the buddySearch process is begun again on the word "tribe".

Using buddySearch on the word "tribe", no word is found to the right or below having the desired properties. The process is then continued to the left and the word "with" is determined to have the desired properties. This information is stored and the buddySearch process is begun again on the word "with" which then reviews the word "jobs".

buddySearch analyzing the word "jobs" first checks to the left, but sees that the word "with" was already marked as found there and that the only words below are too small indicating that nothing to the left that has the desired properties. Finally the process checks above and finds that "Many" is there, but that "Many" has already been marked as being checked. Thereafter, the process is applied all the way back down the recursive tree, checking in remaining directions until all words in that block have been processed.

Once that has been completed, the process may move to the second word on the page, "return". The process would then determine that this word has already been processed and the process would the move on to the next and following words until it finds an unprocessed word. In FIG. 23, the next word it finds is the word "continued" on the line under the title line. In this operation, buddySearch will find the full line in the selected word is contained. Continuing down the list of all words on the page, the next region it founds starts with the word "7,000" and so on. Once the page has been traversed, although the coordinate boundaries of the regions on the pages have not specifically yet be determined, the process has identified a structure that indicates the appropriate number of regions which can be traversed to indicate which words fall in each.

The following text illustrates in psuedocode the simplicity of a recursive algorithm which may be used to provide the above described buddySearch process.

```
Main Loop
    For each word on the page
        If the word has not been processed
            Call buddySearch on the word
        End
    End
buddySearch
    If the word has not been processed
        Mark the word as processed
        If the word has a buddy to the right
            Save that the words are buddies
            Call buddySearch on the buddy
        If the word has a buddy below
            Save that the words are buddies
            Call buddySearch on the buddy
        If the word has a buddy to the left
            Save that the words are buddies
            Call buddySearch on the buddy
        If the word has a buddy above
            Save that the words are buddies
            Call buddySearch on the buddy
    end
```

This approach identifies regions of text on complex pages. The regions can then be fed back to the Regionizer, which implements various strategies for ordering the regions found.

The operations of the processed described above may therefore be used to analyze text images of words to determine the appropriate word order for the words for use, for example, in a word processor or in other tasks which require the words to be in the natural order for interpretation by a human.

We claim as our invention:

1. A method of providing a secure transfer of a high-resolution image, used for non-viewing purposes, over a network from a server to a client, comprising:
   creating a high-resolution image of an original document for non-viewing purposes wherein said high-resolution image has higher resolution than a low-resolution image;
   storing said high-resolution image in a data repository;
   creating said low-resolution image of the original document for viewing purposes wherein said low-resolution image contains all data present in said high-resolution image;
   storing said low-resolution image in a data repository;
   in response to a first user action, transferring from said repository to said client at least a portion of said low-resolution image;
   mapping the location of words or objects on each page of the original document to said low-resolution image to determine a mapping template related to discreet portions of said low-resolution image, wherein said discreet portions are user-selectable and correspond to both the original document and said high-resolution image;
   in response to a second user action, which comprises selecting one or more of said discreet portions of said low-resolution image by establishing the bounds of a box of pixels on said low-resolution image, determining from said mapping template corresponding words or objects in said high-resolution image; and
   transferring, from said server to said client, said corresponding words or objects of said high-resolution image.

2. The method of claim 1 in which said selected portions include words, said method further comprising:
   determining a preferred order of said words in said selected portions.

3. The method of claim 2 in which said transferring further comprises:
   transferring words in said selected portions in said preferred order.

4. The method of claim 3 in which said preferred order is a preferred order for interpretation by a human.

5. The method of claim 2 in which said determining of a preferred order comprises:
   one or more of the following functions, columnizing or regionizing.

6. The method of claim 5 in which said determining of a preferred order further comprises:
   a normalizing function.

7. The method of claim 1, further comprising:
   transferring said selected portion(s) to said client only if said client meets one or more authorization requirements.

8. A method of providing a secure transfer of a page of a document, in the form of a high-resolution image, over a network from a server to a client, comprising the steps of:
   creating a high-resolution image of the original document page;
   creating a low-resolution image of the original document page for presentation to a user wherein said low-resolution image contains all data comprising at least any of the following: words, graphics, content, metadata, structures, or other elements present in said high-resolution image;
   creating a mapping template of the location of words or objects on each page of the original document that assigns a unique identifier to each discreet portion of said low-resolution image;
   establishing the location of each such word or object by defining the bounds of a box of pixels in the original document that includes the word or object, and that is represented in a corresponding discreet portion of said low-resolution image to create user-selectable portions of said low-resolution image;
   in response to a first user action, transferring said low-resolution image of the original document page and its mapping template from the server to the client;
   in response to a further user action, having the client use the mapping template to identify portion(s) of said low-resolution image the user has selected;
   having the client transfer to the server information identifying the selected portion(s) according to the mapping template;
   the server using the mapping information to determine which words, graphics, content, metadata, structures, or other elements of the original document page correspond to the selected portion(s) of said low-resolution image; and
   the server transferring to the client the corresponding selected words, graphics, content, metadata, structures, or other elements of the original document in the form of said high-resolution image.

* * * * *

UNITED STATES PATENT AND TRADEMARK OFFICE
Certificate

Patent No. 7,536,561 B2                                                                       Patented: May 19, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christopher M. Warnock, Los Altos, CA (US); Richard M. Holzgrafe, San Jose, CA (US); Tom J. Santos, San Jose, CA (US); Jay C. Nolan, Sunnyvale, CA (US); and Ken Abrams, Campbell, CA (US).

Signed and Sealed this Seventh Day of May 2013.

*JOSEPH P. HIRL*
*Supervisory Patent Examiner*
*Art Unit 2435*
*Technology Center 2400*